(12) United States Patent
Wang et al.

(10) Patent No.: US 12,437,758 B2
(45) Date of Patent: Oct. 7, 2025

(54) DISPLAY APPARATUS AND A VOICE CONTROL METHOD

(71) Applicant: HISENSE VISUAL TECHNOLOGY CO., LTD., Shandong (CN)

(72) Inventors: Bingqing Wang, Shandong (CN); Wei Gao, Shandong (CN); Shuo Yu, Shandong (CN); Junhou Jiang, Shandong (CN); Yazhou Jia, Shandong (CN); Guohua Yue, Shandong (CN); Xinpei Zhu, Shandong (CN); Dejin Chu, Shandong (CN); Baocheng Li, Shandong (CN); Jialin Li, Shandong (CN); Hanyong Wu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 312 days.

(21) Appl. No.: 18/169,313

(22) Filed: Feb. 15, 2023

(65) Prior Publication Data

US 2023/0197082 A1    Jun. 22, 2023

Related U.S. Application Data

(63) Continuation of application No. PCT/CN2021/119212, filed on Sep. 18, 2021.

(30) Foreign Application Priority Data

Nov. 13, 2020 (CN) .......................... 202011268427.1
Jul. 26, 2021 (CN) .......................... 202110842951.3
Jul. 26, 2021 (CN) .......................... 202110843767.0

(51) Int. Cl.
*G10L 15/18* (2013.01)
*G06F 40/18* (2020.01)
(Continued)

(52) U.S. Cl.
CPC .............. *G10L 15/22* (2013.01); *G06V 30/10* (2022.01); *G10L 15/08* (2013.01)

(58) Field of Classification Search
None
See application file for complete search history.

(56) References Cited

U.S. PATENT DOCUMENTS

2013/0151939 A1* 6/2013 Proux ..................... G06F 40/18
715/212
2015/0213799 A1    7/2015 Han et al.
(Continued)

FOREIGN PATENT DOCUMENTS

CN    103942212 A    7/2014
CN    104244073 A    12/2014
(Continued)

OTHER PUBLICATIONS

International Search Report, mailed Dec. 14, 2021, from PCT/CN2021/119212.
(Continued)

*Primary Examiner* — Seong-Ah A Shin
(74) *Attorney, Agent, or Firm* — Workman Nydegger

(57) ABSTRACT

Some embodiments of the present application disclose a display apparatus and a voice control method for the display apparatus. The display apparatus comprises a display, a detector and a controller. The display is configured to present a user interface, and the detector is configured to acquire user voice information; and the controller is configured to cause the display apparatus to perform: acquiring voice information inputted from a user; in response to the voice information, extracting at least one keyword from the voice information; traversing action items in a configuration library; in response to determining that no action item in the configuration library matches the at least one keyword, obtaining text information of the user interface on the
(Continued)

display to in order to determine an control instruction according to the text information.

18 Claims, 17 Drawing Sheets

(51) Int. Cl.
*G06V 30/10* (2022.01)
*G10L 15/08* (2006.01)
*G10L 15/22* (2006.01)

(56) References Cited

U.S. PATENT DOCUMENTS

| | | | |
|---|---|---|---|
| 2015/0382047 | A1* | 12/2015 | Van Os ............ H04N 21/41265 725/38 |
| 2016/0034253 | A1 | 2/2016 | Bang et al. |
| 2017/0006329 | A1* | 1/2017 | Jang .................. H04N 21/4782 |
| 2017/0323646 | A1* | 11/2017 | Kojima .................. G10L 15/08 |
| 2018/0012595 | A1* | 1/2018 | Weingartner ....... H04L 12/2816 |
| 2018/0018959 | A1* | 1/2018 | Des Jardins ............ G10L 15/08 |
| 2019/0237085 | A1* | 8/2019 | Ryu ........................ G06F 3/165 |
| 2020/0312318 | A1 | 10/2020 | Olson et al. |

FOREIGN PATENT DOCUMENTS

| | | |
|---|---|---|
| CN | 104965596 A | 10/2015 |
| CN | 105278824 A | 1/2016 |
| CN | 105320404 A | 2/2016 |
| CN | 105513594 A | 4/2016 |
| CN | 106201177 A | 12/2016 |
| CN | 107195302 A | 9/2017 |
| CN | 108121528 A | 6/2018 |
| CN | 108538300 A | 9/2018 |
| CN | 109189682 A | 1/2019 |
| CN | 109389554 A | 2/2019 |
| CN | 109471678 A | 3/2019 |
| CN | 109922363 A | 6/2019 |
| CN | 110276281 A | 9/2019 |
| CN | 110428832 A | 11/2019 |
| CN | 111223478 A | 6/2020 |
| CN | 111599358 A | 8/2020 |
| CN | 111656793 A | 9/2020 |
| CN | 111866568 A | 10/2020 |
| CN | 111885400 A | 11/2020 |
| CN | 112511882 A | 3/2021 |
| CN | 112584213 A | 3/2021 |
| WO | 2020130350 A1 | 6/2020 |

OTHER PUBLICATIONS

Chinese Office Action, mailed Feb. 23, 2022, from Chinese patent application No. 2022021802169390.
Chinese Notice of Registration, mailed Aug. 3, 2022, from Chinese Patent App. No. 202011268427.1, 10 pages.
Chinese First Office Action, mailed Apr. 9, 2024, from Chinese Patent App. No. 202110843767.0, 13 pages.

* cited by examiner

DISPLAY APPARATUS AND A VOICE CONTROL METHOD

CROSS REFERENCE TO RELATED APPLICATIONS

This application is a continuation application of PCT/CN2021/119212 filed on Sep. 18, 2021, which claims priorities to Chinese Patent Application No. 202110842951.3, filed on Jul. 26, 2021, Chinese Patent Application No. 202110843767.0, filed on Jul. 26, 2021, and Chinese Patent Application No. 202011268427.1, filed on Nov. 13, 2020, which are incorporated in their entireties herein by reference.

FIELD

The disclosure relates to display apparatuses, and in particular to a display apparatus and a voice control method for the display apparatus.

BACKGROUND

In the smart voice system, voice recognition can convert a sound signal into a text, that is, recognize specific words and phrases. Semantic recognition can convert a text into a specific instruction, that is, process natural language, so as to perform corresponding actions. In some scenarios or applications built in the smart television, relevant operations can be performed through the smart voice system. While for complex and challenging scenarios, it is impossible to make full configuration or to recognize corresponding voice content. For example, when a third-party application named "XX" is installed, the user issues a voice command "turn on XX". The smart voice system is not configured with semantic functions for the third-party software, and thus will not turn on the application in the initial state. Moreover, while a menu named "options" presented on a certain interface, when the user issues a voice command "enter options", if the voice system does not configure with a function for the voice command "enter options", the display device will not perform an action corresponding to "enter options".

SUMMARY

Some embodiments of the disclosure disclose a display apparatus, including a display, configured to display an image from a broadcast system or a network, and/or a user interface; a detector, configured to acquire voice information from a user; and a controller, in connection with the display and the detector and configured to: display a user interface on the display; obtain the voice information input from the user while the user interface is displaying on the display; in response to the voice information, extract at least one keyword from the voice information, wherein the at least one keyword comprises a name content for indicating a controlled object and an action content for indicating an execution action; traverse action items in a configuration library, wherein controlled objects of the action items in the configuration library are configured according to applications built-in the display apparatus; in response to determining that no action item in the configuration library matches the at least one keyword, obtain text information of the user interface on the display, and obtain layout information of the user interface; extract a function control in a layout of the user interface according to the text information, wherein the function control is a control having a first text presented on the display and matched with the at least one keyword; and generate a control instruction according to the function control and the voice information; in response to determining that a first action item in the configuration library matches the at least one keyword, cause the display apparatus to execute the first action item.

Some embodiments of the disclosure disclose a voice control method for a display apparatus, comprising: displaying a user interface on a display of the display apparatus, wherein the display is configured to display an image from a broadcast system or a network, and/or display the user interface: obtaining voice information input from a user while the user interface is displaying on the display; in response to the voice information, extracting at least one keyword from the voice information, wherein the at least one keyword comprises a name content for indicating a controlled object and an action content for indicating an execution action; traversing action items in a configuration library, wherein controlled objects of the action items in the configuration library are configured according to applications built-in the display apparatus; in response to determining that no action item in the configuration library matches the at least one keyword, obtaining text information of the user interface on the display, and obtaining layout information of the user interface; extracting a function control in a layout of the user interface according to the text information, wherein the function control is a control having a first text presented on the display and matched with the at least one keyword; and generate a control instruction according to the function control and the voice information; in response to determining that a first action item in the configuration library matches the at least one keyword, causing the display apparatus to execute the first action item.

DETAILED DESCRIPTION OF THE EMBODIMENTS

In order to make the objectives, implementations, and advantages of the disclosure clearer, the exemplary implementations of the disclosure will be described below with reference to the accompanying drawings in the exemplary embodiments of the disclosure. Obviously, the exemplary embodiments described are some rather than all of the embodiments of the disclosure.

Based on the exemplary embodiments described in the disclosure, all other embodiments obtained by those of ordinary skill in the art without making inventive efforts fall within the scope of protection of the appended claims of the disclosure. It should be noted that the brief description of terms in the disclosure is merely for facilitating the understanding of the implementations described below, and is not intended to limit the implementations of the disclosure. These terms should be understood in accordance with their ordinary and plain meaning, unless otherwise indicated.

Figure 1:
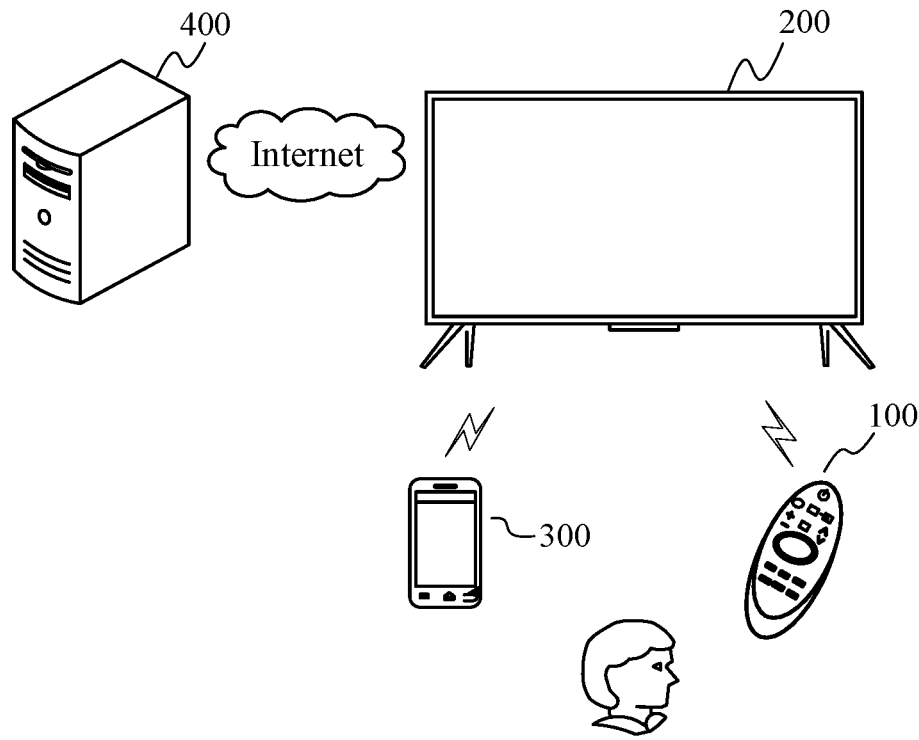
FIG. 1 is a schematic diagram of a scenario between a display apparatus and a control device according to one or more embodiments of the disclosure.

FIG. 1 is a schematic diagram of an operation scenario between a display apparatus and a control device according to one or more embodiments of the present application. As shown in FIG. 1, a user may operate a display apparatus 200 through a mobile terminal 300 and a control device 100. The control device 100 may be a remote control. The remote control can communicate with the display apparatus through an infrared protocol and a Bluetooth protocol, so as to control the display apparatus 200 in wireless or other wired manners. The user may input a command through a key, voice, a control panel, etc. on the remote control, to control the display apparatus 200. In some embodiments, a mobile terminal, a tablet computer, a computer, a notebook computer, and other smart devices may also be used to control the display apparatus 200.

In some embodiments, the mobile terminal 300 and the display apparatus 200 may be installed with software applications for connection communication through a network communication protocol, thereby realizing a one-to-one control operation and data communication. Audio and video contents displayed on the mobile terminal 300 may also be transmitted to the display apparatus 200, thereby realizing a synchronous display function. The display apparatus 200 also performs data communication with a server 400 in a plurality of communication manners. The display apparatus 200 may establish communication connection with the server through a local area network (LAN), a wireless local area network (WLAN), etc. The server 400 may provide various contents and interactions for the display apparatus 200. The display apparatus 200 may be a liquid crystal display, an organic light emitting diode (OLED) display, or a projection display apparatus. In addition to a broadcast receiving television function, the display apparatus 200 may additionally provide a smart network television function supported by a computer.

Figure 2:
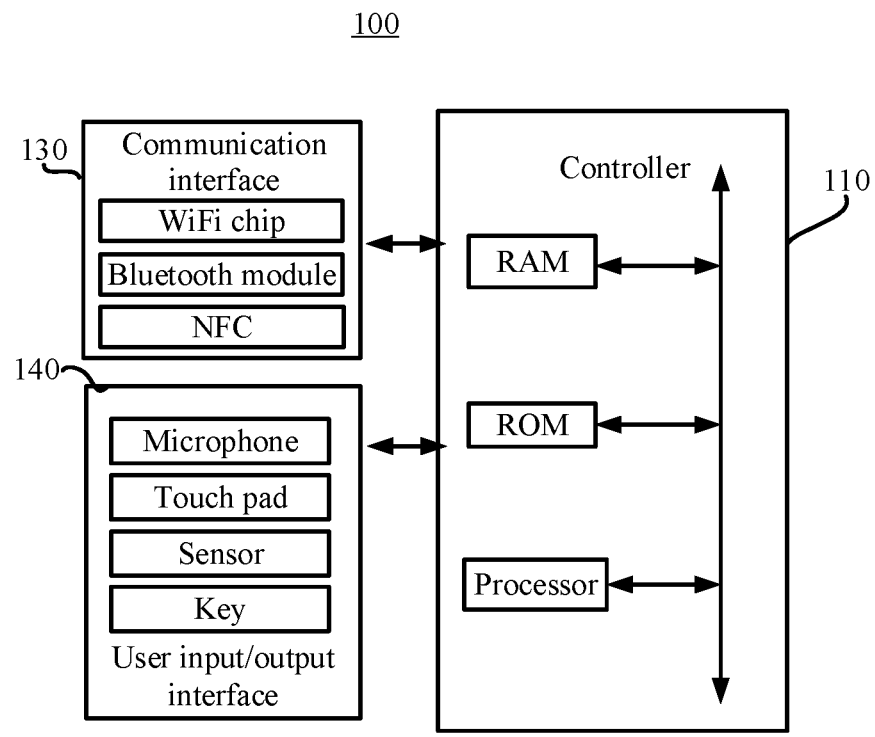
FIG. 2 is a block diagram of a hardware configuration of a display apparatus 200 according to one or more embodiments of the disclosure.

FIG. 2 shows a block diagram of a configuration of a control device 100 according to an exemplary embodiment. As shown in FIG. 2, the control device 100 includes a controller 110, a communication interface 130, a user input/output interface 140, a memory, and a power supply. The control device 100 may receive an operation command from a user, and convert the operation command into an instruction that the display apparatus 200 may recognize and respond to, so as to play an interaction role between the user and the display apparatus 200. The communication interface 130 is used for communicating with outside, and includes at least one of a wireless fidelity (WIFI®) chip, a Bluetooth® module, a near field communication (NFC) module, or an alternative module. The user input/output interface 140 includes at least one of a microphone, a touch pad, a sensor, a key, or an alternative module.

Figure 3:
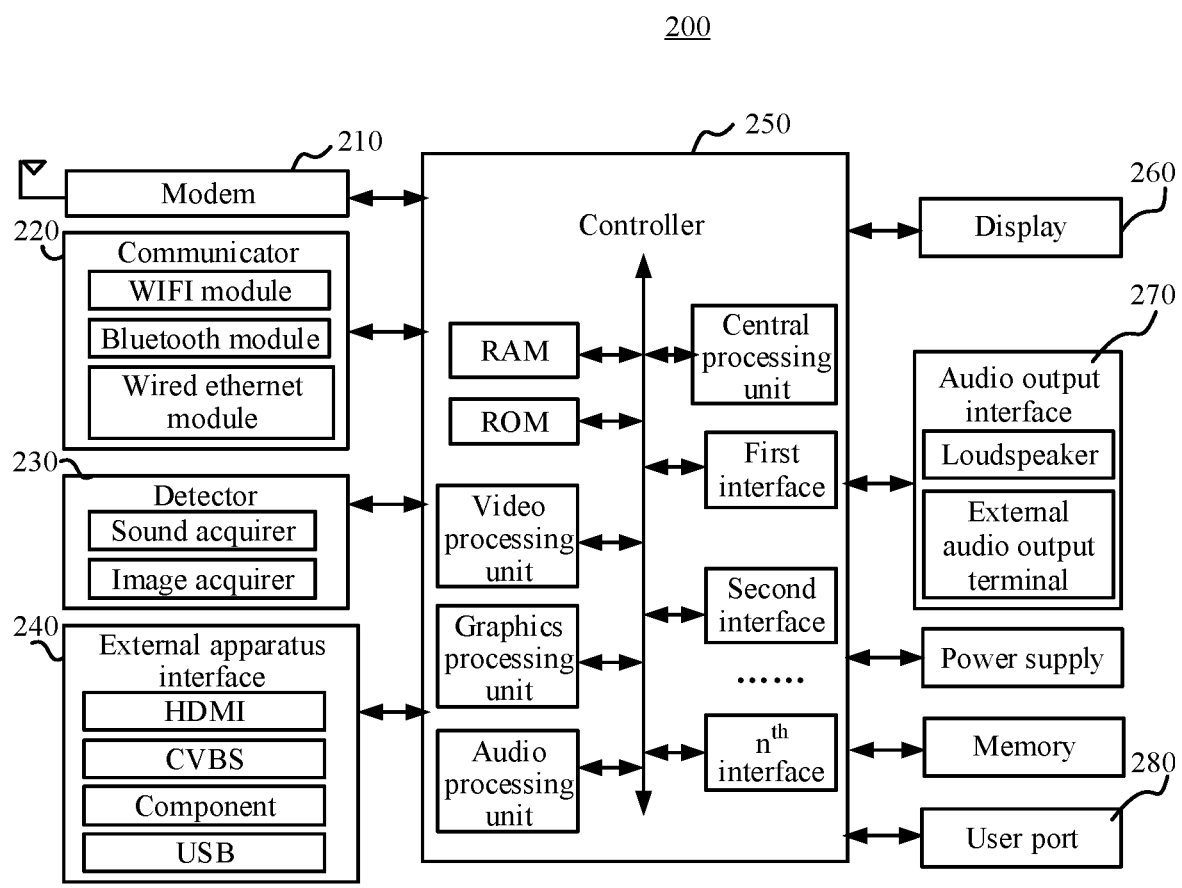
FIG. 3 is a block diagram of a hardware configuration of a control device 100 according to one or more embodiments of the disclosure.

FIG. 3 is a block diagram of a hardware configuration of a display apparatus 200 according to an exemplary embodiment. The display apparatus 200 shown in FIG. 3 includes at least one of a modem 210, a communicator 220, a detector 230, an external device port 240, a controller 250, a display 260, an audio output interface 270, a memory, a power supply, or a user port 280. The controller includes a central processing unit, a video processing unit, an audio processing unit, a graphics processing unit, a random access memory (RAM), a read only memory (ROM), and a first interface to an nth interface for input/output. The display 260 may be at least one of a liquid crystal display, an OLED display, a touch display, or a projection display, and may also be a projection apparatus and a projection screen. The modem 210 receives a broadcast television signal in a wired or wireless manner, and demodulates audio and video signals, EPG (electronic program guide) signals, from a plurality of wireless or wired broadcast television signals. The detector 230 is configured to acquire signals from external environment or signals for interacting with outside. The controller 250 and the modem 210 may be disposed in different individual devices, that is, the modem 210 may also be in an external device of a main device, such as an external set top box, where the controller 250 is disposed.

In some embodiments, the controller 250 controls work of the display apparatus and responds to operations from the user through various software applications stored on the memory. The controller 250 controls an overall operation for the display apparatus 200. The user may input a command on a graphical user interface (GUI) displayed on the display 260, and then the user input interface receives the command input from the user through the graphical user interface (GUI). Alternatively, the user may input a command by inputting a specific sound or gesture, and then the user input interface recognizes the sound or gesture through the sensor, to receive the command input from the user.

Figure 4:
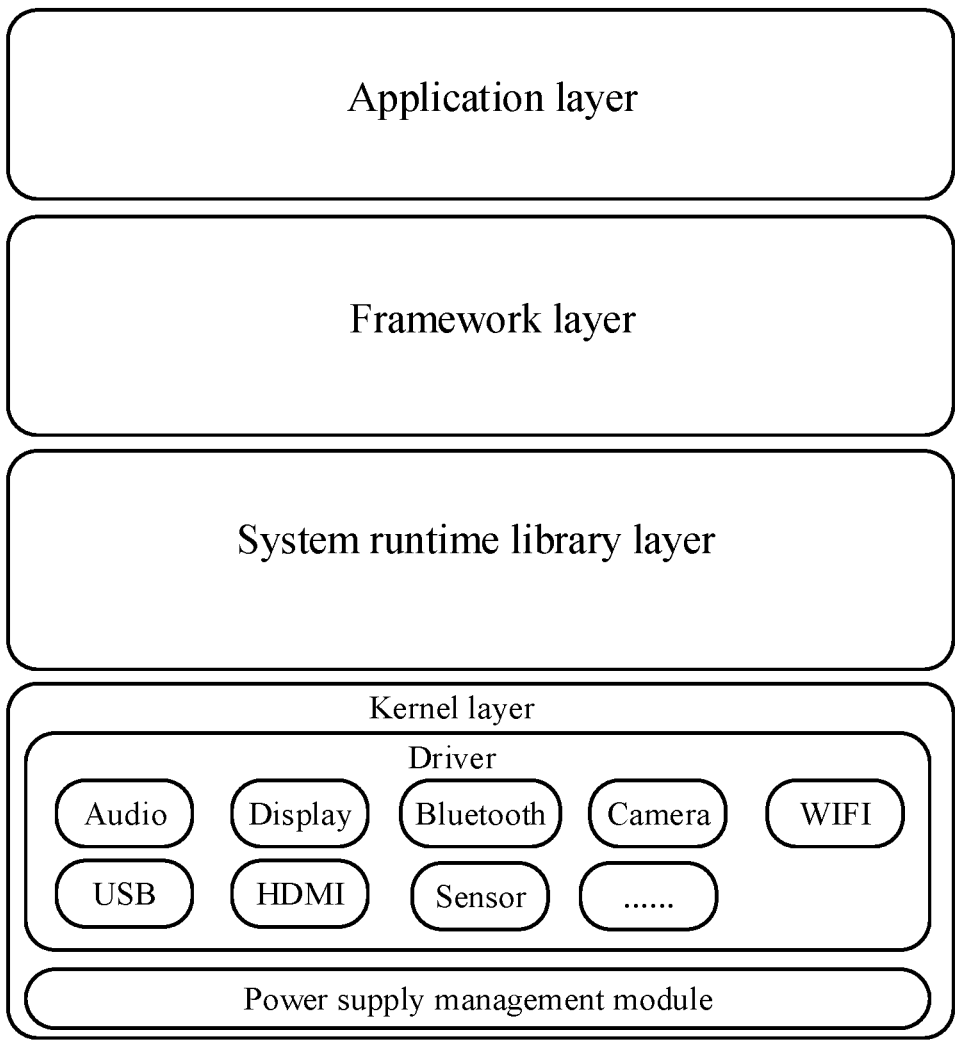
FIG. 4 is a block diagram of a software configuration of a display apparatus 200 according to one or more embodiments of the disclosure.

FIG. 4 is a schematic diagram of a software configuration in a display apparatus 200 according to one or more embodiments of the disclosure. As shown in FIG. 4, a system is divided into four layers, which are an application layer, an application framework layer (referred to as a "framework layer"), an Android runtime and system library layer (referred to as a "system runtime library layer"), and a kernel layer respectively from top to bottom. The kernel layer includes at one or more drivers such as an audio driver, a panel driver, a Bluetooth driver, a camera driver, a WIFI driver, a universal serial bus (USB) driver, a high-definition multimedia interface (HDMI) driver, a sensor driver (for example, a fingerprint sensor, a temperature sensor, or a pressure sensor), or a power supply driver.

Figure 5:
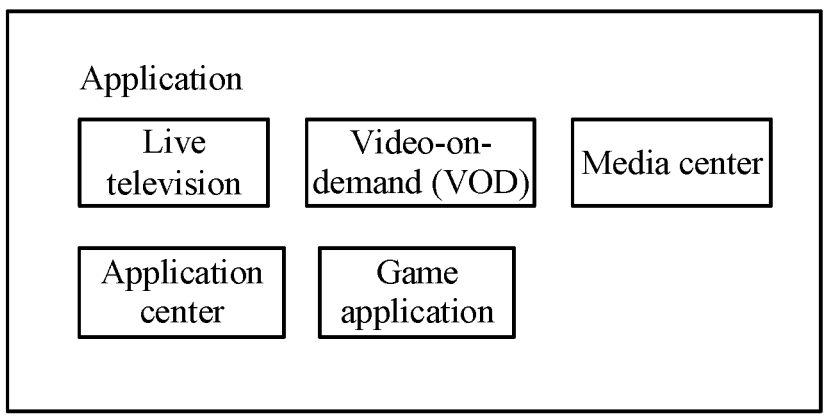
FIG. 5 is a schematic diagram of an interface with one or more application icons in a display apparatus 200 according to one or more embodiments of the disclosure.

FIG. 5 is a schematic display diagram of an interface with application icons in a display apparatus 200 according to one or more embodiments of the disclosure. As shown in FIG. 5, the application layer includes at least one icons, e.g., a live television application icon, a video-on-demand application icon, a media center application icon, an application center icon, a gaming application icon, etc. A live television application provides live television through different signal sources. A video-on-demand application provides video from different storage sources. Different from the live television application, video-on-demand provides videos from certain storage sources. A media center application may play various multimedia contents. An application center may store various applications.

Figure 6:
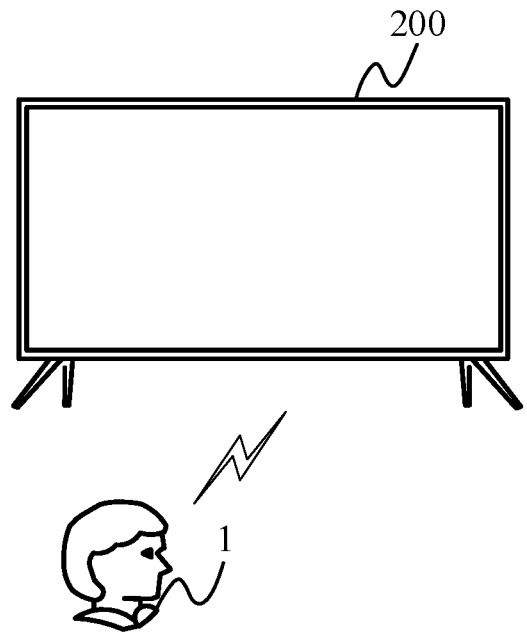
FIG. 6 is a schematic application diagram of a display apparatus in a voice interaction scenario according to one or more embodiments of the disclosure.

FIG. 6 is a schematic application diagram of a display apparatus in a voice interaction scenario according to one or more embodiments of the disclosure. A user 1 may issue a voice command that he/she wants the display apparatus 200 to act. The display apparatus 200 may acquire voice data in real time, recognize an instruction from the user 1 contained in the voice data, and directly execute the instruction after recognizing the instruction from the user 1. In an entire process, the user 1 just simply issues a voice command, instead of actually operating the display apparatus 200 or other devices. In some embodiments, the display apparatus 200 may acquire the voice data in real time through a sound acquirer thereof. Then the sound acquirer 231 transmits the acquired voice data to the controller 250. The controller 250 recognizes an instruction included in the voice data.

Figure 7:
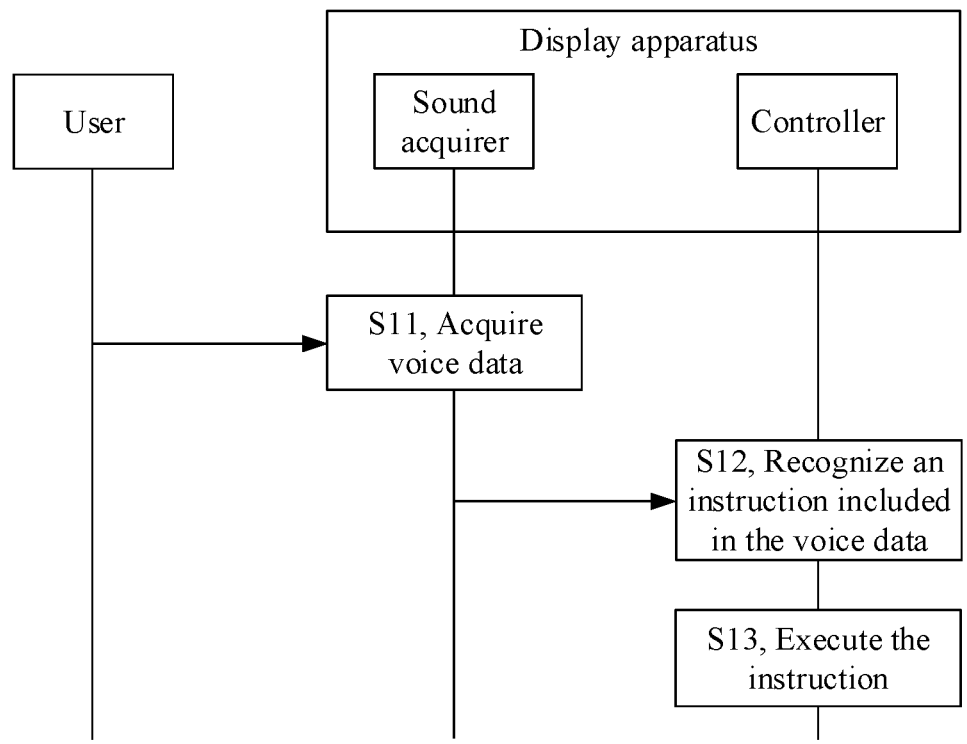
FIG. 7 is a schematic flowchart of a display apparatus in a voice interaction scenario according to one or more embodiments of the disclosure.

FIG. 7 is a schematic flowchart of a display apparatus in a voice interaction scenario according to one or more embodiments of the disclosure, which may be executed by the device shown in FIG. 6. Specifically, in S11, the sound acquirer 231 in the display apparatus 200 acquires voice data from surrounding environment where the display apparatus 200 is positioned in real time, and transmits the acquired voice data to the controller 250 for recognition.

In some embodiments, in S12 shown in FIG. 7, after receiving the voice data, the controller 250 recognizes an instruction included in the voice data. For example, if the voice data include an instruction "increase brightness", the controller 250 may execute the instruction to control the display 275 to increase brightness after recognizing the instruction included in the voice data. It should be understood that in this case, the controller 250 recognizes each of the received voice data. It may occur that no instruction is recognized from the voice data. In some other embodiments, the instruction recognition model is large and low in operation efficiency. It may be further specified that the user 1 adds a wakeup word such as "ABCD" before issuing a voice command. In this way, the user is required to issue "ABCD, increase brightness". Therefore, in S12 shown in FIG. 7, after receiving the voice data, the controller 250 firstly recognizes whether there is a wakeup word "ABCD" in each of the voice data, and then recognizes a specific instruction corresponding to "increase brightness" in the voice data through the instruction recognition model upon the wakeup word is recognized. In some embodiments, after receiving the voice data, the controller 250 may further denoise the voice data, including removing echo and environmental noise, to process the voice data into clean voice data, and recognize the processed voice data.

Figure 8:
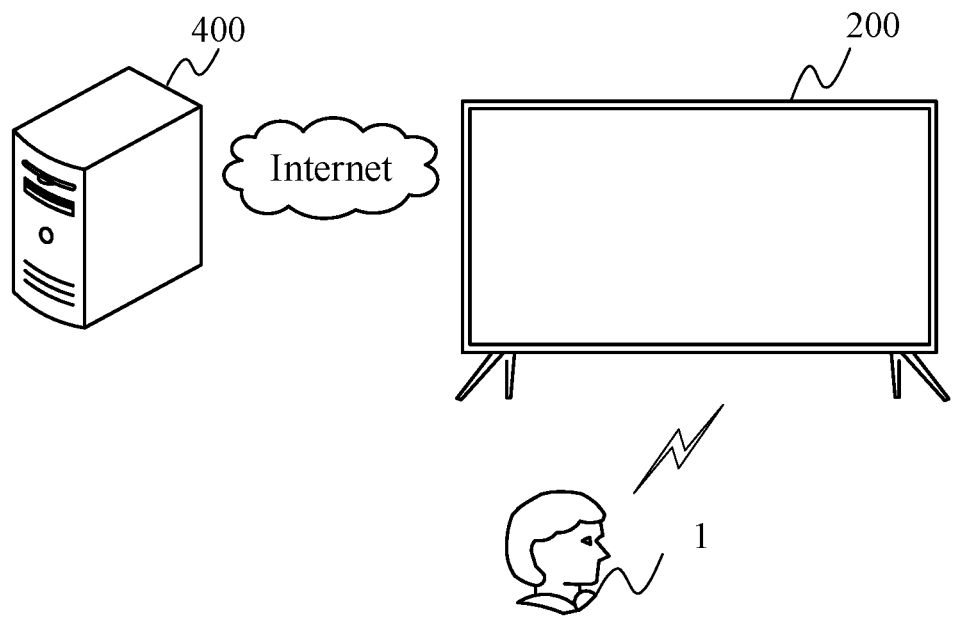
FIG. 8 is another schematic diagram of a display apparatus in a voice interaction scenario according to one or more embodiments of the disclosure.

In some embodiments, FIG. 8 is another schematic application diagram of a display apparatus in a voice interaction scenario according to one or more embodiments of the disclosure. The display apparatus 200 may be connected with a server 400 via Internet. After acquiring the voice data, the display apparatus 200 may transmit the voice data to the server 400 via Internet. The server 400 recognizes an instruction from the voice data, and transmits the recognized instruction back to the display apparatus 200, so that the display apparatus 200 may directly execute the instruction received from the server. Compared with the scenario shown in FIG. 6, in this scenario, computation load for the display apparatus 200 is reduced, and a larger recognition model may be configured on the server 400, thereby further improving the recognition accuracy of the voice data.

In some embodiments, the display apparatus 200 may acquire the voice data in real time through a sound acquirer 231 thereof. The sound acquirer transmits the acquired voice data to a controller 250. The controller 250 transmits the voice data to the server 400 through a communicator 220. After the server 400 recognizes an instruction from the voice data, the display apparatus 200 receives the instruction transmitted from the server 400 through the communicator 220. The received instruction is finally executed by the controller 250.

Figure 9:
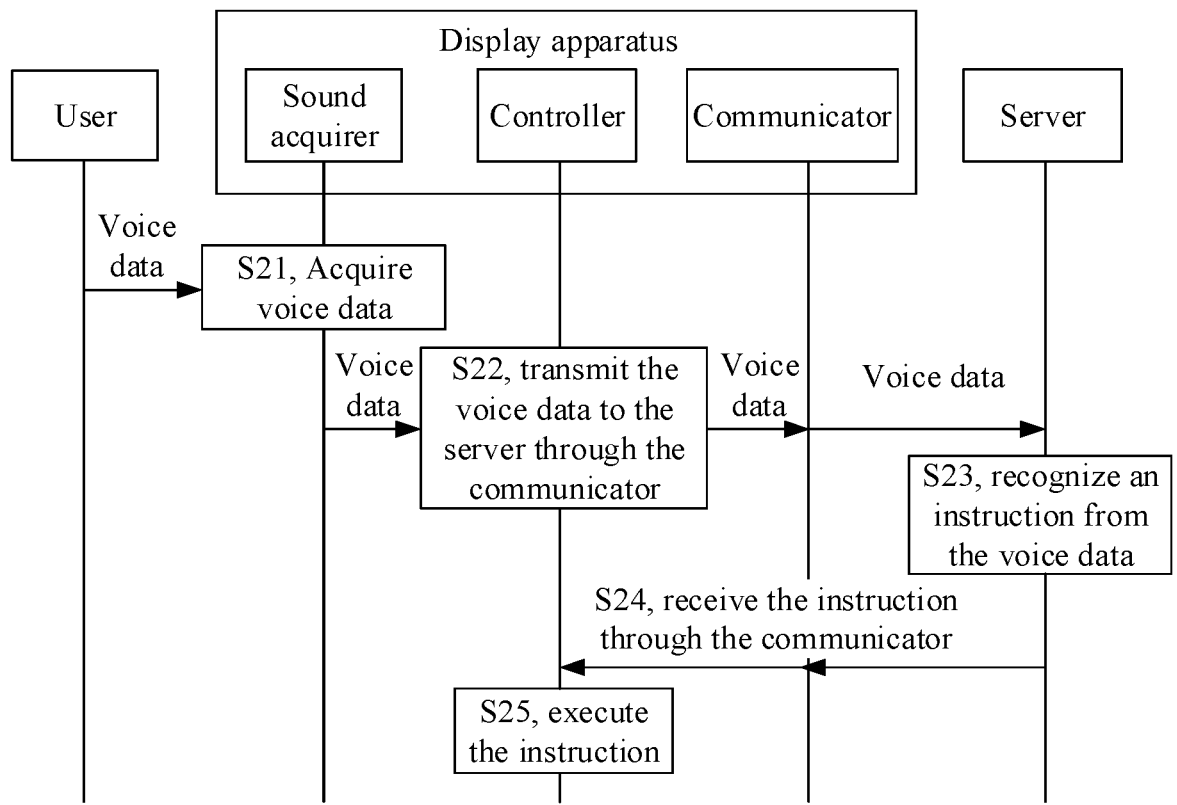
FIG. 9 is another schematic flowchart of a display apparatus in a voice interaction scenario according to one or more embodiments of the disclosure.

In some embodiments, FIG. 9 is another schematic flowchart of a display apparatus in a voice interaction scenario according to one or more embodiments of the disclosure, which may be executed by the apparatus in the scenario shown in FIG. 8. In S21, the sound acquirer 231 in the display apparatus 200 acquires voice data from surrounding environment where the display apparatus 200 is positioned in real time, and transmits the acquired voice data to the controller 250. In S22, the controller 250 further transmits the voice data to the server 400 through the communicator 220. In S23, the server recognizes an instruction from the voice data. Then in S24, the server 400 transmits the recognized instruction back to the display apparatus 200. Correspondingly, the display apparatus 200 receives the instruction through the communicator 220, and then transmits the instruction to the controller 250. Finally, the controller 250 may directly execute the received instruction.

In some embodiments, in S23 shown in FIG. 9, after receiving the voice data, the server 400 recognizes an instruction included in the voice data. For example, the voice data include the instruction "increase brightness" issued by a user 1. However, since the instruction recognition model is large, and the server 400 recognizes each of the received voice data, it may occur that no instruction is recognized from the voice data. Therefore, in order to reduce invalid recognition by the server 400 and the amount of communication interaction data between the display apparatus 200 and the server 400, in some embodiments, it may also be specified that the user 1 adds the wakeup word such as "ABCD" before issuing a command. In this way, the user is required to issue the command "ABCD, increase brightness".

Then in S22, the controller 250 of the display apparatus 200 recognizes whether the wakeup word "ABCD" exists in the voice data first through a wakeup word recognition model with a small size and a small computation amount. If no wakeup word is recognized from the voice data being processed by the controller 250 currently, the controller 250 will not transmit the voice data to the server 400. If the wakeup word is recognized from the voice data being processed by the controller 250 currently, the controller 250 transmits all the voice data or a portion of the voice data, after the wakeup word, to the server 400. The server 400 recognizes the received voice data. Since the wakeup word is included in the voice data received by the controller 250, the voice data sent to the server 400 is more likely to contain an instruction. Therefore, invalid recognition and calculation by the server 400 and invalid communication between the display apparatus 200 and the server 400 may be reduced.

In some embodiments, in order to enable the display apparatus 200 to have a function of recognizing an instruction from voice data in a specific scenario shown in FIG. 6, or enable the display apparatus 200 to have a function of recognizing a wakeup word from voice data in a specific scenario shown in FIG. 6 or 8, as a supplier of a voice interaction function of the display apparatus 200, a machine learning model that may be used for recognizing an instruction or a wakeup word is also required. These models are storied in the display apparatus 200 for use in recognition.

Figure 10:
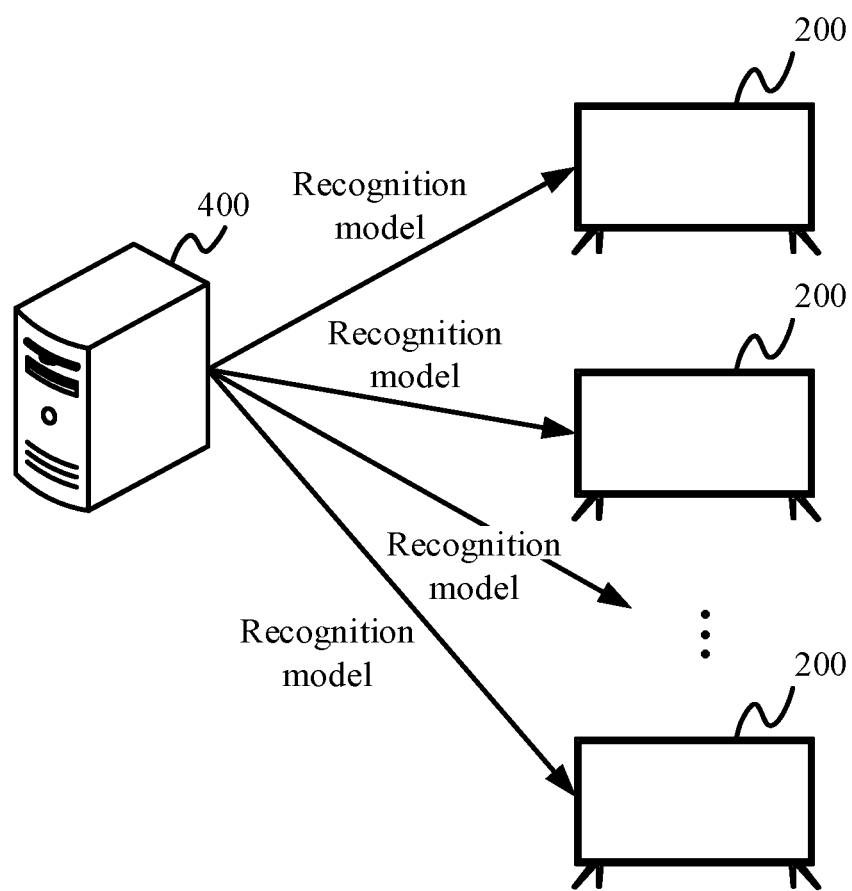
FIG. 10 is a schematic diagram of delivering a recognition model by a supplier according to one or more embodiments of the disclosure.

FIG. 10 is a schematic diagram of issuing a recognition model by a supplier according to one or more embodiments of the disclosure. After obtaining the recognition model (which may be an instruction recognition model or a wakeup word recognition model), the server 400 configured by the supplier may transmit the recognition model to each display apparatus 200. A process shown in FIG. 10 may be performed when the display apparatus 200 is produced. The server 400 transmits the recognition model to each display apparatus 200. Alternatively, the server 400 may transmit the recognition model to the display apparatus 200 via Internet after the display apparatus 200 starts to use.

Figure 11:
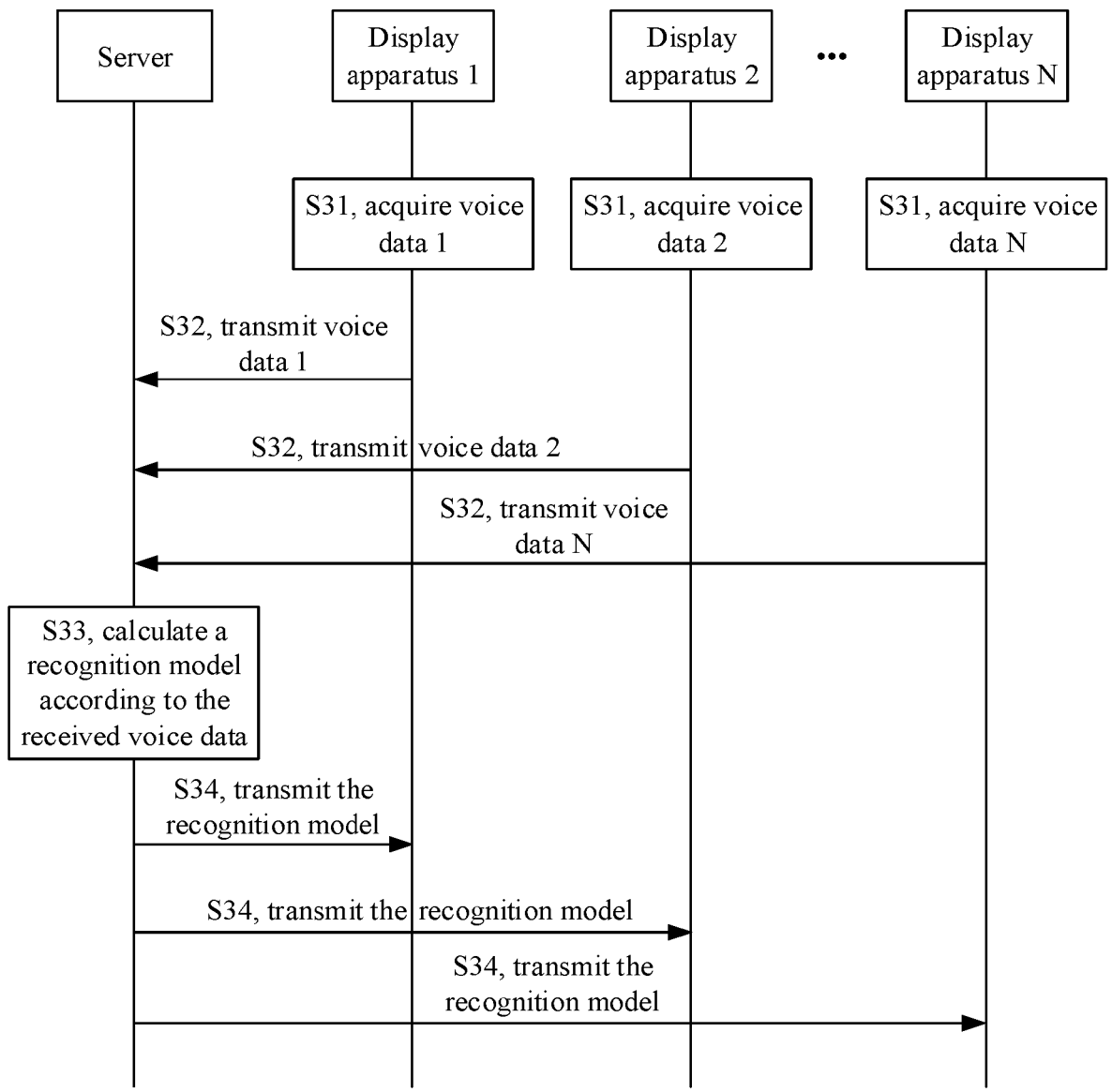
FIG. 11 is a schematic flowchart of obtaining a recognition model by a server according to one or more embodiments of the disclosure.

In some embodiments, specifically, the server 400 may obtain the recognition model by acquiring the voice data and employing the machine learning model for learning. For example, FIG. 11 is a schematic flowchart of obtaining a recognition model by a server 400 according to one or more embodiments of the disclosure. In S31, the display apparatuses (taking a total of N display apparatuses, display apparatuses 1 to N as an example) acquire voice data 1 to N, and transmit acquired voice data 1 to N to the server 400 in S32. Then in S33, after marking each of the voice data and the instruction or wakeup word included in the voice data, the voice data and marked information corresponding to the voice data are transmitted as sample data into the machine learning model for learning by the server 400. When the recognition model obtained upon learning is used, after inputting voice data for recognition, the recognition model compares the voice data with learned voice data, and outputs a probability of a piece of marked information. Finally marked information with a maximum probability may be used as a recognition result of the voice data. In S34, the server 400 may transmit the calculated recognition model to each display apparatus.

In some embodiments, as shown in FIG. 11, a process of acquiring the voice data and transmitting the voice data to the server from the display apparatuses 1 to N, and a process of obtaining the recognition model by performing calculation and transmitting the same to display apparatuses 1 to N from the server 400 may be independent of each other. That is, in S32, the server receives the voice data acquired by N display apparatuses, and in S34, the server may transmit the trained recognition model to other N display apparatuses. The N display apparatuses in the two processes may be the same or not, or may be partially the same.

Figure 12:
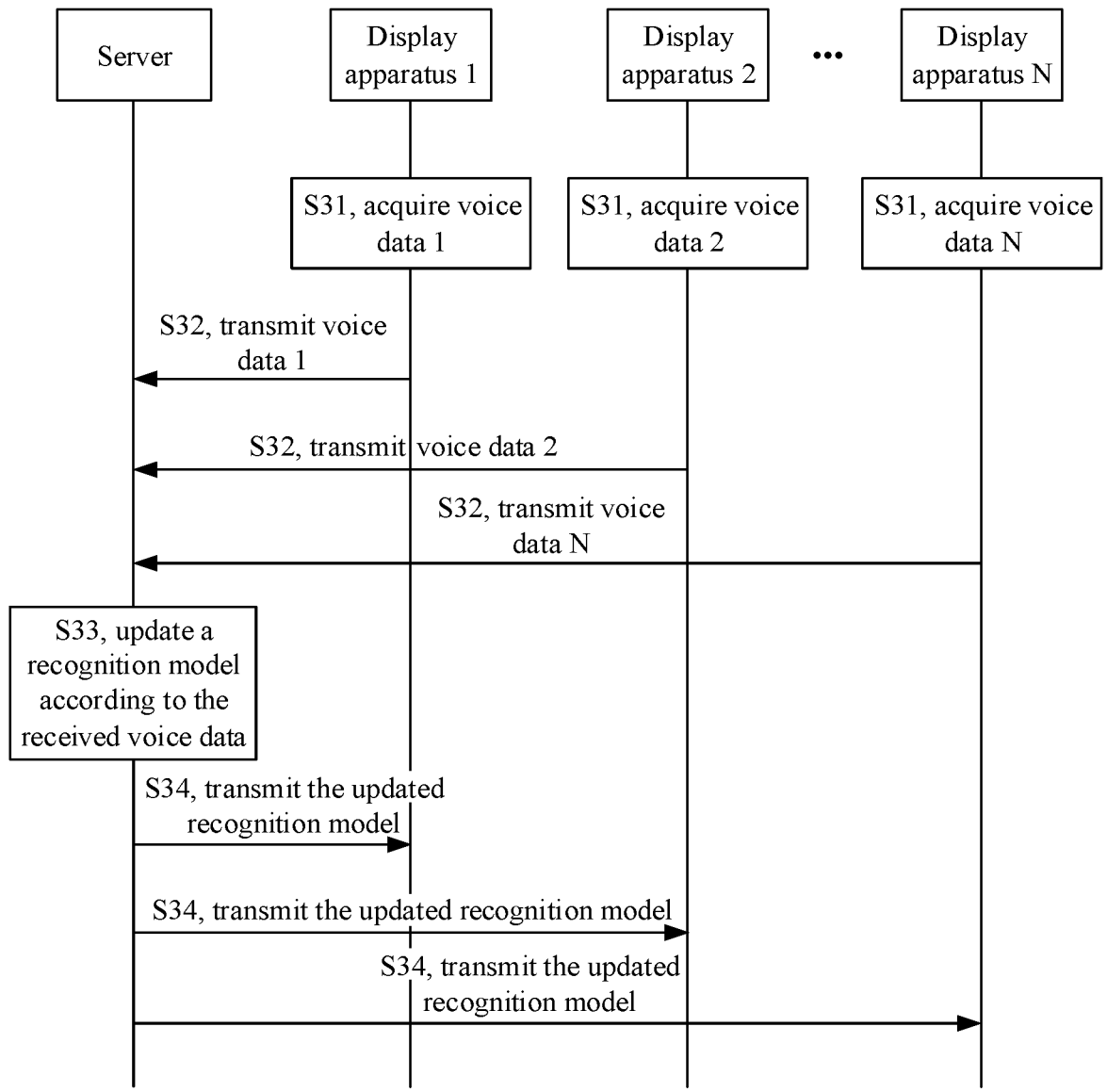
FIG. 12 is a schematic flowchart of updating a recognition model by a server according to one or more embodiments of the disclosure.

In some embodiments, owing to the limited number of samples used in obtaining the recognition model, the recognition model configured in the display apparatus 200 fails to achieve completely accurate recognition. Therefore, the supplier may also collect voice data acquired by each display apparatus 200 during use at any time through the server 400, and update the recognition model obtained through recognition according to the acquired voice data, thereby further improving the recognition accuracy of the recognition model. For example, FIG. 12 is a schematic flowchart of updating a recognition model by a server according to one or more embodiments of the disclosure. It should be understood that before an embodiment shown in FIG. 12 is executed, the recognition model is configured in each display apparatus in a manner shown in FIG. 10. In S31 shown in FIG. 12, all the display apparatuses (taking a total of N display apparatuses, display apparatuses 1 to N as an example) acquire voice data 1 to N, and transmit acquired voice data 1 to N to the server 400 in S32. Then in S33, after marking each of the voice data and the instruction or wakeup word included in the voice data, the voice data and marked information corresponding to the voice data are transmitted as sample data into the machine learning model. The server updates the calculated recognition model according to the new received voice data. In S34, the server 400 may retransmit the updated recognition model to each display apparatus 200, so that each display apparatus 200 may use the updated recognition model for update. For any one of the N display apparatuses, the new learning model employs the voice data acquired by the display apparatus 200, and thus subsequent recognition accuracy of voice data acquired by the display apparatus 200 may be effectively improved.

In some embodiments, each display apparatus shown in FIG. 12 may transmit the voice data to the server after receiving the voice data, or transmit voice data acquired over a fixed time period to the server after this fixed time period, or transmit a certain number of acquired voice data in a pile to the server, or transmit the received voice data to the server according to an instruction from a user of the display apparatus, or transmit the received voice data to the server according to an instruction from the user of the display apparatus or an instruction from staff of the server. In some embodiments, the N display apparatuses shown in FIG. 12 may transmit the voice data to the server at a same appointed time point, and the server updates the recognition model according to the N received voice data. Alternatively, the N display apparatuses may also transmit the voice data to the server separately, and the server may start to update the recognition model according to the received voice data after the number of the received voice data is greater than N.

Based on the display apparatus 200 and the voice interaction function, the user may control the display apparatus 200 by voice, thereby greatly facilitating operation for the user. In order to realize the voice interaction function, a plurality of execution actions are required to be configured in voice interaction function software. For example, in order to adapt to a voice input "increase brightness", it is required to configure an execution action of increasing brightness in the voice interaction system. A specific control instruction related to increasing brightness and control parameters, such as a specific value of increasing brightness, etc., related to increasing brightness are required to be specified. Obviously, due to the rich and diverse input voice, in order to adapt to different voice inputs, numerous control instructions are required to be configured.

For example, current UI configurations of an Android system are generally divided into: built-in applications, images or texts that may be configured in a background, and third-party applications installed by users. Generally, the built-in applications have been configured with actions, and may execute the corresponding actions when such applications are waken up via voice. For the images or characters that may be configured in a background, different characters or images will be presented according to actual situations, which makes it difficult to configure a voice wakeup action. However, due to the diversity of user behaviors, the third-party applications will not be configured with actions. Therefore, the use area of a voice interaction will be greatly limited, leading to poor user experience.

Figure 13:
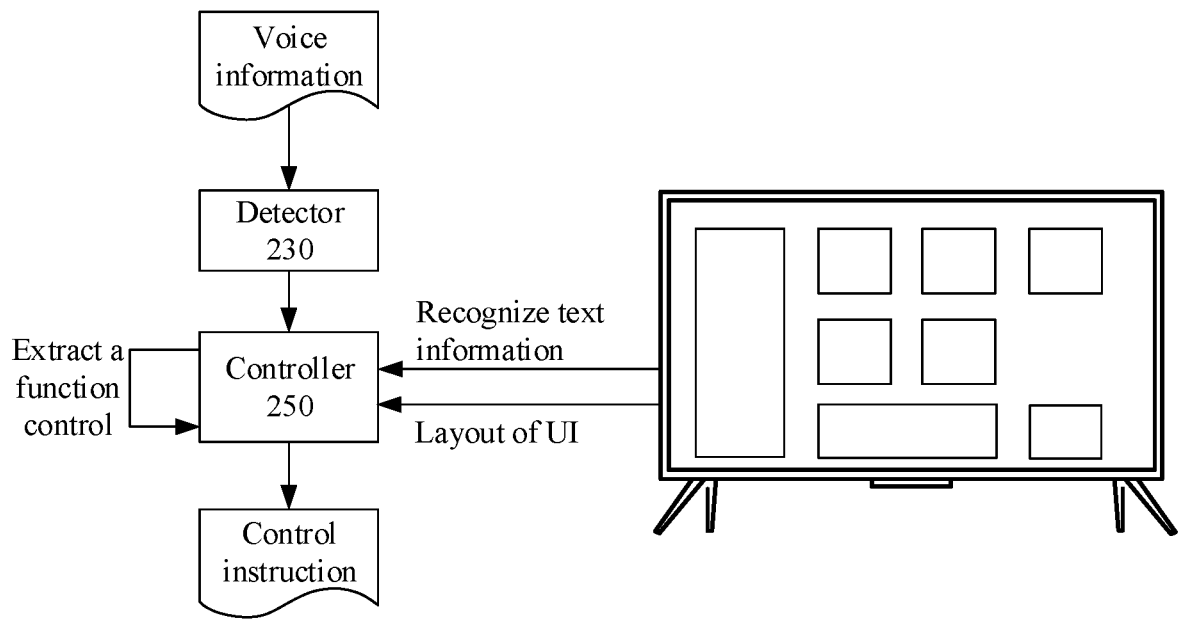
FIG. 13 is a schematic diagram of data processing in a voice interaction of a display apparatus according to one or more embodiments of the disclosure.
Figure 14:
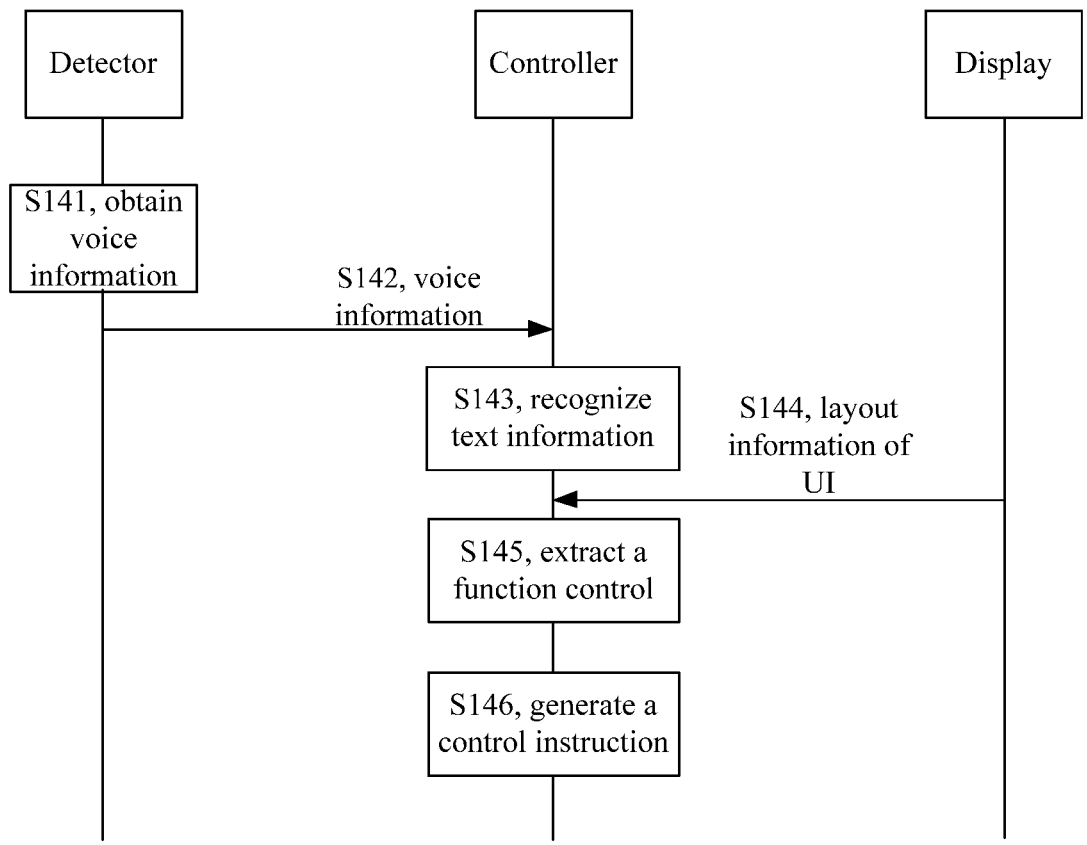
FIG. 14 is a schematic flowchart of a voice wakeup method according to one or more embodiments of the disclosure.

In order to improve voice interaction function, some embodiments provide a method for triggering a control on a display apparatus. The method may be performed by the display apparatus 200 described above. In order to realize the voice wakeup method, the display apparatus 200 may include a display 275, a detector 230, and a controller 250. The detector 230 may be a sound acquirer 231 configured to acquire voice information from a user. As shown in FIGS. 13 and 14, the voice wakeup method may include: step S141, obtaining voice information input from a user by the detector.

In the present embodiments, the voice information may be input in a voice form. For example, a user inputs voice information "open life" through a microphone on the control device 100 or a microphone on the display apparatus 200. After the user inputs the voice information, the control device 100 or the display apparatus 200 may convert a sound signal input from the user into an electrical signal, and transmit the electrical signal to the controller for processing.

In response to the voice information, the voice wakeup method may include: step S143, recognizing text information from an interface presented on a display of the display apparatus.

After step S142 of obtaining the voice information input from the user by the controller 250, the controller 250 may perform a corresponding action in response to the voice information, that is, perform matching in an instruction library configured in advance according to content of the voice information input from the user to determine the action corresponding to the voice information. When the input voice information is not configured with a corresponding action, the text information may be recognized from a current interface presented on the display, so as to determine a user intention according to the recognized text information.

For example, for the voice data "open life" input from the user, the controller 250 may do match for the voice data "open life" and determine a control instruction, corresponding to "open life", in the instruction library. "Life" is a kind of image or text that may be configured in the background, that is, "life" may be used as a link or entry control on a display interface and is constantly adjusted with background use conditions. In some scenarios, a "life" option may be presented, and may not be presented in some other scenarios. Therefore, no voice instruction related to "life" is configured in the instruction library. In this case, the controller may need to perform recognizing text information from an interface presented on the display of the display apparatus.

In order to recognize the text information from the interface presented on the display, different text recognition methods may be used in the embodiments. For example, a screenshot of the interface presented on the display may be taken, and image processing may be performed on an image obtained through screenshot, so as to recognize a content of the text in the image. Moreover, all the controls, characters, and images in the current display interface may be obtained by obtaining specific parameters in an algorithm program of the display interface in real time, and then the controls, texts, and images are analyzed one by one to extract texts corresponding to the controls, texts, and images. Obviously, different objects have different extraction methods. For example, a control name may be extracted for a control, specific text content may be directly extracted for the text, and recognition is performed for an image similar to the methods described above.

The voice wakeup method may include: step S144, obtaining layout information of a current UI by the controller 250 after recognizing the text from the interface presented on the display. The layout information of the UI comprises data from one or more controls capable of executing interaction operations in the current interface and positions corresponding to the one or more controls. For example, the control that may execute an interaction in the current interface may be recorded as "title: life; control: key; size: 60×30 . . . " in the layout information of the UI. In this way, each control that may execute an interaction action may be recorded in the form described above for subsequent analysis.

The voice wakeup method may include: S145, extracting a function control in the layout of the UI by the controller 250 according to the text information.

The controller 250 may further extract the function control according to the recognized text information and the layout information of the UI after recognizing the text information from the interface presented on the display and obtaining the layout information of the UI. The function control is a control corresponding to a controlled object specified in the voice information from the user.

For example, for the voice information "open life" input from the user, the text information "life" may be recognized from the interface presented on the display, and the layout information of the current UI and information of the control (s), text(s), image(s), etc. containing in the current UI may be obtained. A control with a title "name" which supports key operation also exists in the layout information of the UI, so the control is determined as the function control.

In some scenarios, a specific display content, on the interface, of the control is not exactly the same as information recorded in the layout information of the UI. For example, a control with a title "promotion" is actually presented as a specific advertisement language, such as "latest movie" on the interface In this case, the function control may also be determined according to a corresponding relation between the position of the control and the position of the recognized text. That is, the function control is a control positioned at a position of the same text information in the layout information of the UI as the voice information.

For example, upon seeing "latest movie" presented in an upper left corner region of the current interface, the user inputs a voice command "turn on a latest movie". Since the control with a title "promotion" which supports key operation from the remote controller is different from "latest movie" in the voice input from the user, the function control may be determined by matching the position of the recognized text with the position of the control which supports key operation. That is, when it is recognized that the position of the text information corresponding to "latest movie" is in the upper left corner region, and correspondingly, the control with the title "promotion" is also in the upper left corner region, the control with the title "promotion" is determined as the function control.

The voice wakeup method may include: S145, generating a control instruction by the controller 250 according to the function control and the voice information.

After the function control is determined, the control instruction may be generated in combination with the voice information. That is, a specific control action is determined according to a type of the function control and an action specified in the voice information, and then the control instruction is generated. Obviously, different types of function controls support different operation actions. For example, if the function control is a key, a click operation is executed. If the function control is a picture, operations such as enlarging, click, etc. may be executed. If the function control is a label, an operation of obtaining a focus may be executed, so that the focus is swiped to a position of the label in the interface for display. If the function control is an application icon, an operation of launching this application may be executed.

Therefore, through the voice wakeup method, when the voice information from the user is not configured with an action, a function control specifically controlled by the voice information from the user may be determined by recognizing text content from the current display interface in combination with the layout information of the UI. Therefore, the control instruction is generated to realize corresponding control. The method may adapt to complex and flexible interface scenarios, thereby improving the voice interaction recognition efficiency, and reducing a workload of a configuration process.

As can be seen from the voice wakeup method according to the embodiments described above, the voice wakeup method is mainly used for automatically recognizing the action for related control when the voice information is not configured with an action, and executing a corresponding action. Therefore, in order to facilitate the recognition of function control and action, in some embodiments, the step that voice information from a user is obtained further includes: acquiring the voice information from the user via the detector, then converting the voice information into a voice text, and extracting keywords from the voice text.

After the user issues specific voice content, the voice detector 231 may acquire the voice content and generate voice information to transmit to the controller 250. Then the controller 250 converts the voice information, and recognizes text content according to specific parameters of the voice information, to obtain the voice text. The controller 250 then extracts the keywords from the voice text for subsequent matching operations.

The keyword are words with actual meaning in the voice text, and may be nouns, verbs, etc. The keywords may include a name word for indicating a controlled object, such as "content", etc.; and an action word for indicating an action, such as "open", etc. For example, after obtaining the converted voice text, the controller 250 may process the converted voice text through a natural language processing model. The voice text undergo sentence segmentation processing. A long sentence is converted into a set of phrases or words, so as to do part-of-speech tagging for the phrases or words, and to extract nouns or verbs as one or more keywords to use in the subsequent matching process and a control instruction generation process.

Figure 15:
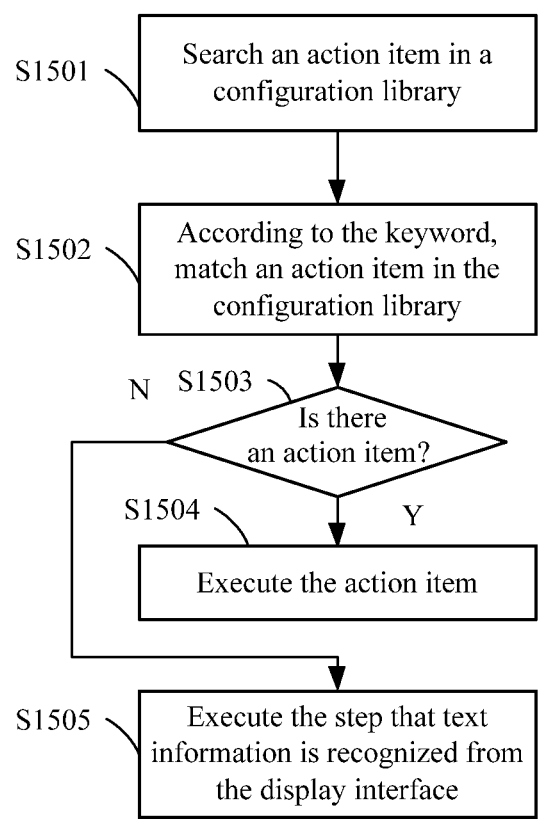
FIG. 15 is a schematic flowchart of matching an action item according to one or more embodiments of the disclosure.

In some embodiments, in the process of processing the voice text, an action corresponding to the voice information may also be matched to determine whether the currently input voice information is configured with a corresponding action. That is, as shown in FIG. 15, the step that keywords are extracted from the voice text further includes: step S1501, according to the name word and the action word, searching an action item in the configuration library; step S1502, according to the keyword, matching an action item in the configuration library; step S1503, determining whether there is an action item; step S1504, if there is an action item corresponding to the keyword in the configuration library, executing the action item; and step S1505, if there is no action item corresponding to the keyword in the configuration library, executing the text information recognized from the display interface.

After being extracted, the keyword may be used for matching in the preset configuration library to determine whether the currently input voice information has been configured with a corresponding action. If an action item is matched according to the keyword, it means that the current voice information is recognizable, that is, the interaction function may for the keyword, which means that it is impossible to recognize the current voice information directly. Therefore, an operation associated with text information recognized from the display interface may be executed to realize the voice interaction through the voice wakeup method.

For example, when the voice content from the user is "open a setting option", the extracted keywords are "open" and "setting option" after the language processing described above. In this case, since the setting option is a built-in application in the system of the display apparatus 200, and has been configured with the action, the action, that is, the action for "open setting", may be directly extracted. When the voice content from the user is "open a content", extracted keywords are "open" and "content" after the language processing described above. Since there is no built-in application named "content" in the system, it is impossible to match a corresponding action, and voice wakeup procedure may be realized by executing steps like performing an operation associated with text information recognized from the display interface and subsequent operations.

It can be seen from the embodiments that, whether the voice information has been configured with an action may be filtered through the keyword(s), so that the voice information that has been configured with an action will not perform the voice wakeup method described above, thereby reducing the data processing amount, and increasing a response speed of the voice interaction.

Figure 16:
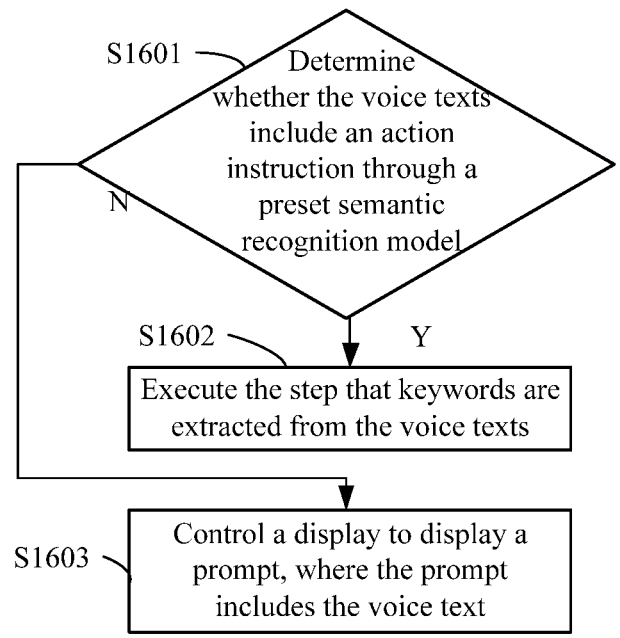
FIG. 16 is a schematic flowchart of determining an action instruction in a text extracted from voice according to one or more embodiments of the disclosure.

The voice information input from the user through the voice system may be voice information with a control function, for example, "open a content option", or voice information without a control function, such as "Hisense TV". Obviously, for the voice information with a control function, the voice information may be converted into a specific action according to the above embodiments. For the voice information without control function, the specific control action is generally not associated with the voice information, or is not configured with a control action globally, for example, the input voice information text is searched via a search engine. Therefore, for the voice information without a control function, it is not required to configure a corresponding action. That is, as shown in FIG. 16, in some embodiments, before the step that keywords are extracted from the voice text, the method further includes: step S1601, whether the voice text include an action instruction is determined through a preset semantic recognition model; step S1602, if the voice text include the action instruction, the step that keywords are extracted from the voice texts is executed; and step S1603, if the voice text does not include the action instruction, the display is controlled to display a prompt, where the prompt includes the voice text.

Specifically, in order to determine whether the voice text(s) includes an action instruction, a voice processing system may perform part-of-speech tagging for the voice text. Generally, when the voice text(s) includes a verb, it may be determined that the current voice text(s) includes an action instruction. If the voice text(s) only includes a noun and an adjective, it may be determined that the current voice text does not include an action instruction.

Obviously, in order to obtain a more accurate determination result, determination of whether the voice text includes an action instruction is not limited to the part-of-speech determination manner described above. In actual application, whether the voice text include an action instruction may also be determined in more complex determination manners such as through a language processing model, synonym association substitute, etc. For example, a classification model for determining whether an action instruction is included may be obtained through data training. After the voice text is input into a trained classification model to output a determination result, that is, a classification probability of whether the voice text include an action instruction, so as to perform subsequent determination.

When the voice text includes an action instruction, the current voice information may be configured with an action. Therefore, the action for voice interaction may be configured for corresponding voice information according to the embodiments described above, that is, the step that keywords are extracted from the voice text and the subsequent steps are executed until an action for the voice information is obtained. When the voice text does not include an action instruction, the voice information may be directly displayed in a manner set by the system without executing a program related to action configuration. For example, the display 275 may be controlled to display a prompt, and the voice text may be displayed in the prompt. Alternatively, a general control action is executed, for example, searching the voice text content on a search engine.

It can be seen from the embodiments that, by determining whether the voice text include an action instruction, the voice text may be screened before a configured action is executed. Therefore, the voice information that does not configure with a specific action is filtered out, thereby reducing the data processing load in the match process.

In some embodiments, in order to recognize the text information included in the display interface, the text information in the display interface may be obtained through optical character recognition (OCR), that is, the recognizing text information from a display interface further includes: obtaining a screenshot of a current display interface on the display to generate an image of a current display interface; and performing OCR on the image of the current display interface to obtain the text information.

When the text information is required to be recognized, the controller 250 may take the screenshot of the current display interface through a screenshot program, to obtain an image of the current display interface presented on the display 275. Then the text information is obtained from the screenshot image by executing OCR operation. The specific OCR method may be set according to actual hardware configuration of the display apparatus 200, and may be, for example, a character recognition method based on artificial intelligence, a neural network, a genetic algorithm, etc.

In order to facilitate subsequent matching between the text information and the layout information of the UI, a position of a recognized word or phrase may also be recorded while the OCR is performed on the image of the current display interface, that is, the text information includes the recognized text content and a position of the text content, in the image of the current display interface. For example, the text content that may be obtained from the image of the current display interface is "life", and a position of the phrase or word "life" may also be extracted. The position of the phrase or word may be indicated by a coordinate of a central position of a pixel region occupied by the phrase or word.

Since the text information recognized from the image of the current display interface includes specific text content and the position of the text content, an object in the current display interface and an object in the layout of the UI may be matched according to the text content and/or the position of the text content, so as to determine a function control.

That is, in some embodiments, the layout information of the UI and the text information may be matched according to the recognized text content, so as to determine a control corresponding to the recognized text content. Since there may be a difference between recognized text content and a control name, when matching text content and control name, the match for the text information may expand, so extracting a function control further includes: creating a set of associated words according to the text information; traversing all control names in the layout information of the UI; comparing the control names with the set of associated words; and if a control name of the control names is the same as a word item in the set of associated words, marking a control corresponding to this control name as the function control.

After recognizing the text information, the controller 250 may construct a set of words associated with the text information. The set of associated word includes synonyms of the name word in the text information, that is, the set of associated words may be formed by combining a plurality of words associated with the text information. The word(s) associated with the text information may be a synonym of the name word, or another similar word. For example, if the text content extracted from the screenshot image is "latest movie", words associated with the text content may be synonyms such as "new movie" and "newly released movie", or words having a configured association such as "video promotion", "movie promotion", and "movie recommendation".

During construction of the set of associated words, all the control names in the layout information of the UI may also be traversed, and the traversed control names are compared with the set of associated words. That is, the control names and the set of associated words are matched with each other, to determine whether a control name in the layout of the current UI is same as a word item in the set of associated words. If a control name is same as a word item in the set of associated words, a control corresponding to this control name is marked as a function control, that is, the control action in the voice information may be executed on this control.

For example, the text content recognized from the screenshot image is "latest movie", and a set of associated words constructed according to the text content includes word items such as "new movie", "newly released movie", "video promotion", "movie promotion", and "movie recommendation". If there is a control named "movie recommendation" in the layout information of the UI, since the control name is same as a word item in the set of associated words "latest movie", the control named "movie recommendation" is marked as the function control.

It can be seen from the embodiments described above, by matching the control name in the layout of the UI with the text content recognized from the screenshot image, the associated relationship between part of the text in the current display interface and a control in the layout of the UI may be determined to extract a function control. The voice information input from the user may include part of the text in the current display interface, so that a control object specified in the voice information input from the user may be recognized, and an action corresponding to unconfigured voice information may be realized. Moreover, a function control may be extracted through the comparison between the text content and its set of associated words and control name(s) on the layout of the user interface, thereby reducing the data matching load, and improving a matching efficiency.

Since a portion of text recognized from an image of the display interface is not closely associated with a control name in the layout information of the UI, it is difficult to obtain a control name with similar content through matching according to the text content. Therefore, the image of the current display interface and the layout information of the UI may also be matched according to the position of the text content. That is, in some examples, the step that the function control is extracted further includes: traversing positions of all controls in the layout information of the UI; calculating a distance between a position of a recognized content text in an image of the current display interface, and a position of a control in the layout information of the UI; and if the distance is less than or equal to a preset distance threshold, marking the control corresponding to the distance as a function control.

In order to obtain a corresponding relation between content text and control(s), after the text information is recognized, a position of each content text in the text information may also be obtained. Moreover, the positions of all the controls in the layout information of the UI are traversed. Then a distance between the two positions, that is, the positions of the controls and the positions of the content texts, is calculated, so that the content text and the control which are close to each other in distance are determined to be associated, that is, this control is marked as a function control.

Figure 17:
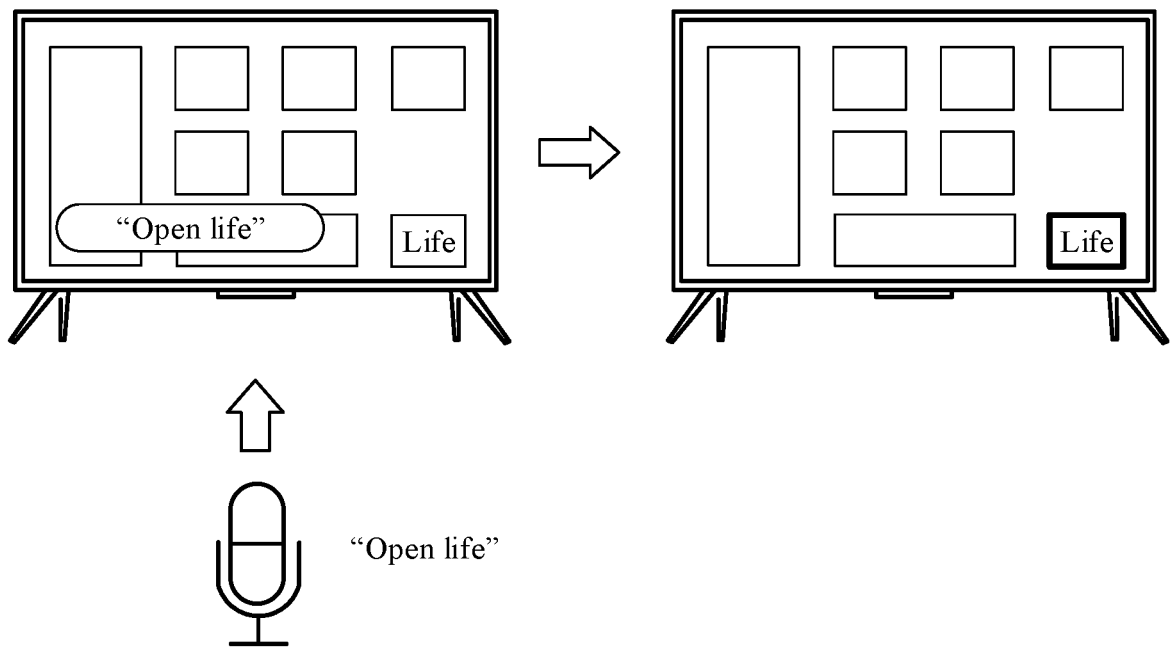
FIG. 17 is a schematic diagram of a voice interaction according to one or more embodiments of the disclosure.
Figure 18:
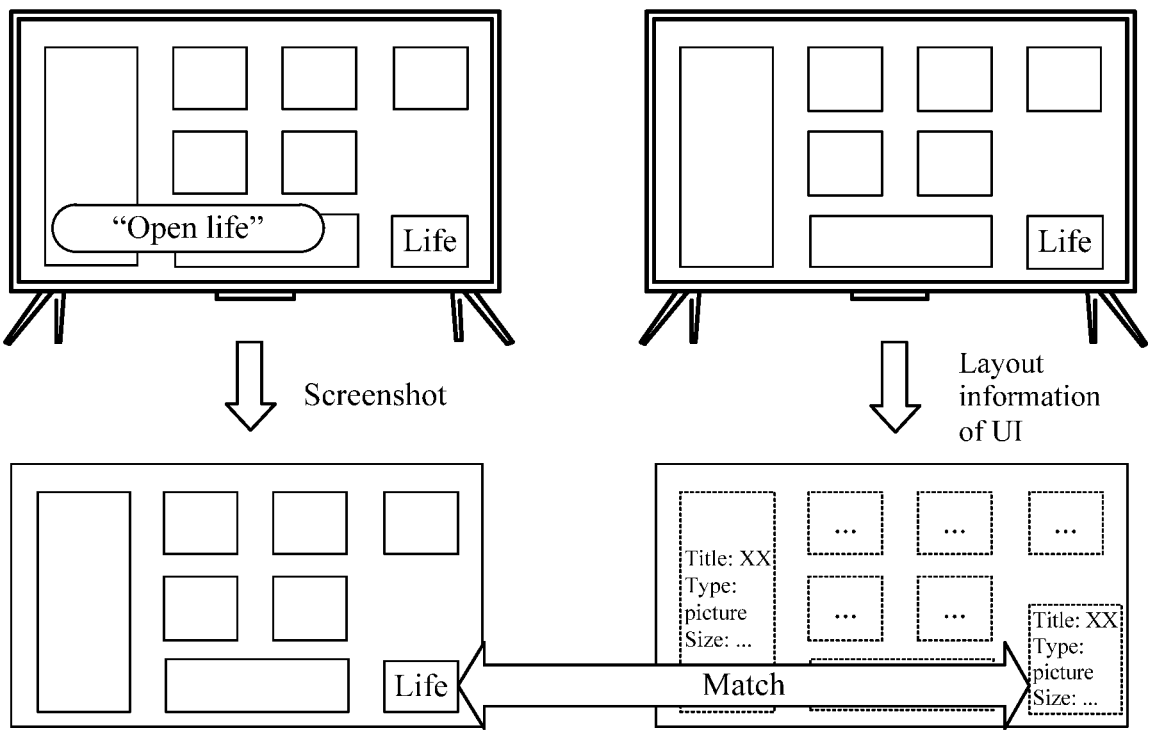
FIG. 18 is a schematic flowchart of extracting a function control according to one or more embodiments of the disclosure.

For example, as shown in FIGS. 17 and 18, the voice content input from the user is "open life", where an operation object is "life". The text information recognized from the image of the current display interface also includes a content text "life". Therefore, position information of the content text "life" is extracted. For example, the position information is (1720, 880). Then by traversing the positions of all the controls in the layout information of the UI, a control closest to (1720, 880) in distance is determined as the function control so as to generate a control instruction for this control.

As can be seen from the above embodiments, the voice wakeup method described above may match the position of the content text with the position of the control in the layout of the UI, so as to establish the correspondence relation between the content text and the control which are closest to each other in distance. Therefore, this matching method may avoid the inconsistency between the control name and an actually displayed text, and may also confirm the corresponding relation, thereby obtaining the control object and configuring the action for the control object.

It should be noted that in the embodiments described above, in order to match the text information recognized from the current interface with the layout information of the UI, a more accurate corresponding relation may be obtained by combining a plurality of matching methods. For example, after the text information is recognized, the text information may be compared with the control name first to determine a control with same or similar content as the text information. Then the distance between the text information and the control may be determined through position determination, so that the control with same or similar content as the text information and being close to the text information is marked as a function control.

In addition, a specific method for extracting the function control may also use different matching methods according to different types of the current display interface. For example, on a home page interface, when the text content in the display interface is generally quite different from actual control names, that is, when the background is configured with a plurality of pictures or related controls, a matching method of extracting a function control according to the position may be used. In a resource list interface, such as an "All movies" interface, the content presented on such interface is generally the same as a resource name, that is, the text information has the same or similar content as a control name, so that a matching method of extracting a function control according to the content may be used.

After extracting the function control, the controller 250 may further generate a control instruction for the function control. Therefore, in some embodiments of the disclosure, the step that the control instruction is generated according to the function control and the voice information further includes: obtaining operation types supported by the function control and an action type specified in the voice information; comparing the operation types with the action type; and in response to at least one of the operation types supported by the function control being same as the action type, generating a control instruction.

After extracting the function control, the controller 250 may further obtain the operation type(s) supported by the function control. In general, different types of controls support different types of operations. For example, an image control may support operation types such as click, move, zoom, etc. A button control only supports an operation type, a click operation.

The action type specified in the voice information may also be obtained while the operation type supported by the function control is obtained. The action type specified in the voice information may be obtained via part-of-speech tagging to recognize a verb in the voice information. For example, if the voice information input from the user is "open life", a portion of the voice information, serving as a verb, is "open". Therefore, the action type specified in the voice information is an open action.

After obtaining the operation type(s) and the action type, it may be determined whether the current function control supports an operation corresponding to the action type through comparison. If at least one of the operation types supported by the function control is the same as the action type, it is determined that the current function control supports the control action specified in the voice information, and a control instruction is generated. Similarly, if none of the operation types supported by the function control is the same as the action type, it is impossible to generate a control instruction. Therefore, a prompt interface can be presented for the user to indicate that the current voice may not be recognized.

For example, if the voice information input from the user is "open life", it is determined that the function control associated with "life" is a button control named "life". However, the button control only supports a click action, and "open" specified in the voice information may be implemented through click. Therefore, the control instruction, that is, the control instruction for instructing click of the "life" button may be generated.

It can be seen from the present embodiments, by determining the operation type supported by the function control, one executable control instruction may be generated, thereby executing the configured action, and increasing a configuration success rate.

Figure 19:
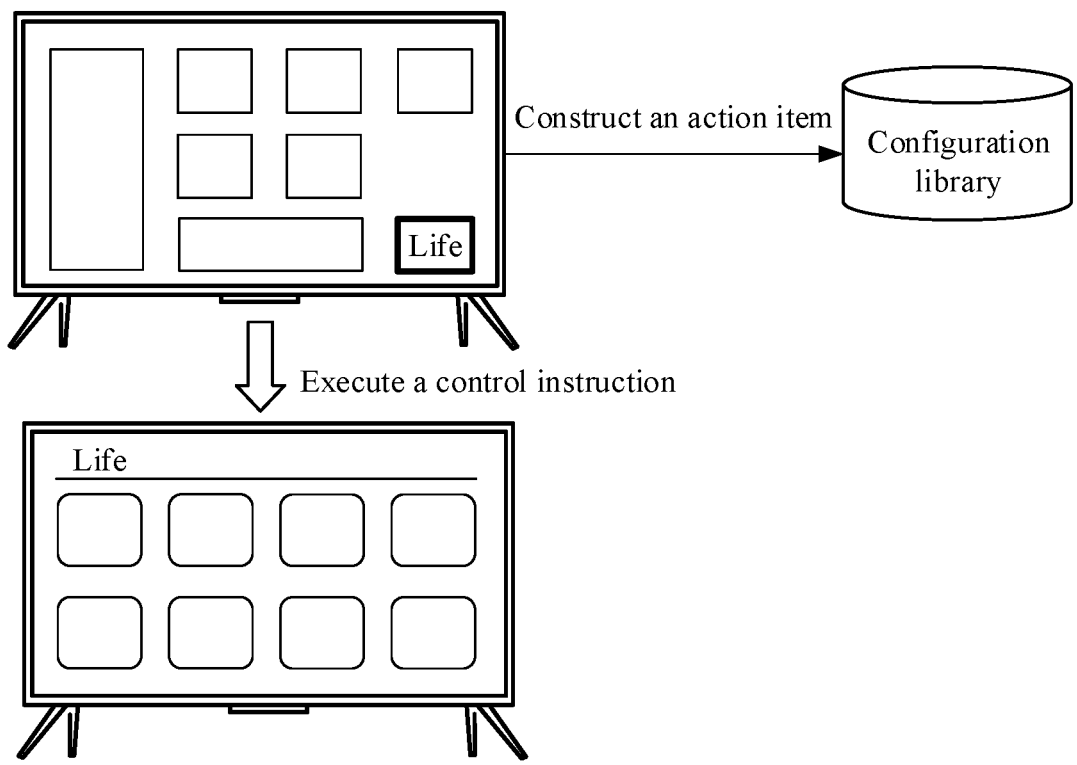
FIG. 19 is a schematic flowchart of executing a control instruction according to one or more embodiments of the disclosure.

As shown in FIG. 19, after generating the control instruction, the controller 250 may further implement a corresponding action by executing a control instruction. During execution of the control instruction, an action item may also be newly constructed in the configuration library to store the control instruction as a configured action. Therefore, in a subsequent voice interaction process, if same or similar voice information is input, an action item may be directly obtained from the configuration library to execute the corresponding control instruction and implement the action.

Based on the voice wakeup method described above, some embodiments of the disclosure further provide a display apparatus 200. As shown in FIG. 13, the display apparatus 200 includes a display 275, a detector 230, and a controller 250. The display 275 is configured to present an image and/or a user interface, and the detector 230 is configured to acquire voice information from a user; and the controller 250 is configured to perform: obtaining voice information input from a user; in response to the voice information, recognizing text information from a display interface presented on the display of the display apparatus, and determining current layout information of the display interface; extracting a function control according to the current layout information of the display interface, wherein the function control is a control whose name is same as a first portion of the text information, wherein the first portion of the text information is a portion of the text information; and generating a control instruction according to the function control and the voice information.

As can be seen that, the display apparatus 200 according to the disclosure includes the display 275, the detector 230, and the controller 250. The controller 250 may obtain the voice information input from the user through the detector 230, and determine the function control whose name is same as a control object specified in the voice information by recognizing text presented on a current display interface in combination with a layout of the current user interface, so as to generate a control instruction. According to the display apparatus, when the voice information input from the user includes a voice instruction which is not configured in advance, the function control is determined by recognizing text content from the current display interface, so as to execute a control instruction corresponding to the voice information, thereby increasing a recognition rate, and reducing a configuration workload.

In some embodiments, the OCR method may convert a screenshot image from an image form into a text form, and obtain text information included in the screenshot image. When OCR is performed on the screenshot image, a plurality of specific texts may be obtained. Moreover, position information of each text, in the screenshot image, which can correspond to, position information of each text, in the user interface, may also be recognized. Therefore, image recognition information includes a plurality of pieces of text recognition information, and each piece of text recognition information may include a specific recognized text and position information of the recognized text.

It should be noted that the OCR method may only recognize text information, and may not identify a specific control name. Therefore, a piece of recognized text may include a plurality of control names. For example, the recognized text may be "featured*uploader award*strongest animation season*Chinese-made". The recognized text includes specific words, and is uniformly expressed by characters in the embodiments of the disclosure. "*" indicates a space, that is, a null character. Moreover, the position information of the entire text in the user interface may also be recognized.

Figure 20:
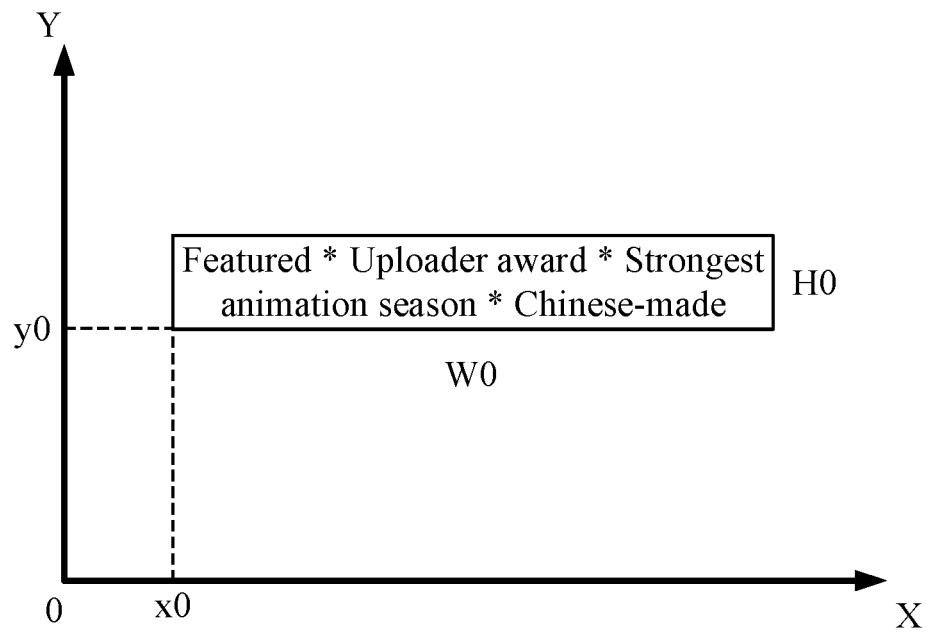
FIG. 20 is a schematic diagram of text recognition information according to one or more embodiments of the disclosure.

The text may be deemed as a rectangular region. The position information of the text may be expressed as (x0, y0, W0, H0). (x0, y0) represents coordinates of a certain vertex or central point of the rectangular region, W0 represents a length of the text, and H0 represents a height of the text. In the embodiments of the disclosure, (x0, y0) is set as a vertex in a lower left corner of the rectangular region. FIG. 20 is a schematic diagram of text recognition information according to one or more embodiments of the disclosure.

In some embodiments, after obtaining the image recognition information, the controller may determine a plurality of pieces of text recognition information included in the image recognition information, where each piece of text recognition information includes a recognized text and position information of the recognized text in the user interface.

A control may have a control keyword, for example, a word, a phrase or a text presented on the control icon which is visible on the user interface. The controller may match one or more control keywords with all the recognized texts to determine which recognized text(s) includes a control keyword. Those recognized texts having control keywords serve as recognized texts for control keywords. Once the recognized texts for control keywords are determined, which portion of the recognized text has a text same as a control keyword can be determined. The portion of the recognized text whose content is same as the control keyword serves as a recognized text of the control word. Recognition information of the recognized text of the control word comprises the recognized text of the control word and position information thereof in the layout of the user interface.

In some embodiments, the controller may obtain position information, in the user interface, of the control keyword according to the recognition information of the recognized text of the control keyword. Specifically, the recognition information of the recognized text of the control keyword may include character information, and the character information refers to position information of each character in the recognized text of the control keyword. The controller may determine the position information of each character of the control keyword in the recognized text of the control word according to the character information of each character. Then position information of the control keyword in the user interface may then be determined according to the position information of each character in the control keyword.

In some embodiments, when the user interfaces presented on the display are different, recognition information of the recognized text of the control keyword corresponding to different user interfaces is also different. However, the recognition information of the recognized text of the control keyword might not contain character information. Therefore, before obtaining the position information of each character of the control keyword, the recognition information of the recognized text of the control word may be detected first, and whether the recognition information includes character information may be determined.

When it is detected that the recognition information of the recognized text of the control word includes character information, the position information of each character of the control keyword may be determined directly according to the character information in the recognition information.

When it is detected that the recognition information of the recognized text of the control word does not include character information, the controller may determine character information according to the recognition information of the recognized text of the control word.

In some embodiments, the controller may obtain sizes of a character and a null character first.

The size of a character may be determined according to the position information in the recognized text(s) for control keyword(s). It is assumed that the position information of a recognized text for a control word is (x0, y0, W0, H0). A height of each character in the recognized text is the same, and is a height of the recognized text for the control word, that is, H0.

A length and the height of each character may be in a fixed ratio, for example, the length of a character is $\alpha H0$, where $\alpha$ is a ratio of the length to the height. In the embodiments of the disclosure, the length and the height of each character are set to be the same for illustration. Therefore, the size of the character is the length=the height=H0.

The length of the character and the height of the character are the same, and are both the height H0 of the recognized text. However, the length and height of a null character may be different, so it is required to determine the length and height of a null character.

In some embodiments, the length of a null character may set as a fixed value. Specifically, the length $S_{NC}$ of a null character may be set by a user. For example, the length of a null character may be set to be the same as the length of a typical character, that is, $S_{NC}=H0$.

In some embodiments, there may be a fixed ratio $\theta$ between the length of a null character and the length of a typical character, which may be 0.8. That is, $S_{NC}=\theta*H0$.

In some embodiments, the length $S_{NC}$ of a null character may be calculated through a preset null character formula.

Specifically, the length of the recognized text for the control word is W0. The controller may determine a total number $N_C$ of typical characters and a total number $N_{NC}$ of null characters in the recognized text for the control keyword. According to the total number of the typical characters and the length of a character, a total length of the characters in the recognized text for control keyword may be calculated.

A difference between the length W0 of the recognized text for control word and the total length of the typical characters is calculated to obtain a total length of the null characters. The length of the null character may be determined according to the total length of the null characters and the total number of the null characters.

Specifically, null character formula (1) is shown as below.

$$S_{NC} = \frac{W0 - N_C * H0}{N_{NC}}. \qquad \text{formula (1)}$$

In some embodiments, after the length of a typical character and the length of a null character are determined, the position information of each character in the recognized text for the control keyword may be obtained.

Each character may also be deemed as a rectangular region, and position information of each character may be set as (xi, yi, Wi, Hi).

Specifically, the position information of the recognized text for control word is (x0, y0, W0, H0). The length and the height of a character are the same as the height of the recognized text for control word, so Wi=Hi=H0, and yi=y0. That is, the position information of each character is (xi, y0, H0, H0). In this case, it is required to determine an X coordinate of a vertex in a lower left corner of each character.

In some embodiments, when the X coordinate of the vertex in the lower left corner of each character is determined, the controller may first determine the number of typical characters and the number of null characters between a first character ranked first in the recognized text for control word in position and each character in the recognized text for control word. The number of characters between the first character and each character is a serial number of these characters, that is, the ranking of the characters in the recognized text for the control word.

A total length of characters between the first character and each character may be calculated according to the number of the characters, and denoted as a first character length. Similarly, a total length of null characters between the first character and each character may also be calculated according to the number of the null characters, and denoted as a first null character length.

Therefore, a length between the first character and each character may be further determined according to the first character length and the first null character length, and the X coordinate of the vertex in the lower left corner of each character may be obtained according to the length.

Specifically, calculation formula (2) of xi of the X coordinate is shown as below.

$$xi = x0 + \sum_{k=1}^{i-1} H0 + \sum_{k=0}^{n} S_{NC}. \qquad \text{formula (2)}$$

Where xi represents an X coordinate of a vertex in a lower left corner of an $i^{th}$ character in the recognized text for the control keyword, i represents a serial number of the character, n represents the number of null characters between the first character and the $i^{th}$ character in the recognized text for control word, and $S_{NC}$ represents the length of the null character.

The X coordinate of the vertex in the lower left corner of each character may be calculated through the formula described above, and the position information (xi, y0, H0, H0) of each character may be further determined.

In some embodiments, considering that there may be character intervals between characters adjacent to each other, between a typical character and a null character adjacent to each other, and between null characters adjacent to each other, the controller may obtain the X coordinate of the vertex in the lower left corner of each character according to the character interval.

In the embodiments of the disclosure, all the character intervals are set to be the same, and a length of the character interval is γ.

When the X coordinate of the vertex in the lower left corner of each character is obtained, the controller may calculate the sum of the number of the typical characters and the number of the null characters between the first character and each character, and denote the sum as a first number. A total length of character intervals between the first character and each character may be calculated based on the first number and the length of the character interval.

The length between the first character and each character may be further determined according to the total length of the character intervals, and the X coordinate of the vertex in the lower left corner of each character may be obtained according to the length.

Specifically, calculation formula (3) of xi of the X coordinate is shown as below.

$$xi = x0 + \sum_{k=1}^{i-1} H0 + \sum_{k=0}^{n} S_{NC} + (i-1+n)*\gamma. \qquad \text{formula (3)}$$

Calculation formula (4) of xi of the X coordinate may also be shown as below.

$$xi = x0 + \sum_{k=1}^{i-1} (H0+\gamma) + \sum_{k=0}^{n} (S_{NC}+\gamma). \qquad \text{formula (4)}$$

The X coordinate of the vertex in the lower left corner of each character may be calculated through the formula described above, and the position information (xi, y0, H0, H0) of each character may be further determined.

In some embodiments, after the position information of each character in the recognized text for control keyword is determined, each character of the control keyword may be screened from the recognized text for the control word, and the position information of each character in the control keyword may be determined.

In some embodiments, the controller may determine position information, in the user interface, of an entire control keyword according to the position information of each character of the control keyword.

Specifically, it is assumed that position information of the first character of the control keyword is (x1, y0, H0, H0), and position information of a last character ranked last in the recognized text for control word in position is (xz, y0, H0, H0).

The X coordinate of the vertex in the lower left corner of the control keyword is x1 of the X coordinate of the first character, and a Y coordinate of the vertex in the lower left corner of the control keyword is y0. The control keyword has a length of (xz−x1+H0) and a height of H0.

Therefore, the position information of the control keyword is (x1, y0, xz−x1+H0, H0).

In some embodiments, a central coordinate of the control keyword may also be calculated as [x1+(xz−x1+H0)/2, y0+H0/2], that is, [(xz+x1+H0)/2, y0+H0/2]. The central coordinate may be used as the position information of the control keyword.

In some embodiments, except for the typical character(s) and the null character(s), considering that some special characters, such as digits and punctuations, may exist in the recognized text for the control keyword, the size of a special character is also required to be determined.

The sizes of special character(s) may be different. Considering that the recognized text for control word is a line of text, a height of all the special characters may be set to be the same as that of the recognized text, that is, the height of all the special characters is H0. In this case, it is required to determine a length of each special character. The special characters may be digits, foreign language words or letters, and punctuations.

In some embodiments, for the special digit characters, it may be deemed that each digit has the same length, and there is a fixed ratio a between a special digit character and a typical character, that is, all the special digit characters have the length of a*H0.

In some embodiments, for the special foreign language character, a foreign language character may have a different length. For examples, letters "i" and "m" have different lengths. In this case, a fixed length may be set for each letter. In consideration of capital and small cases of the letters, lengths of 26 capital letters and lengths of 26 small letters may be set separately. With the recognized text "featured*uploader award*strongest animation season*Chinese-made" as an example, letters "U" and "P" have a specific length.

In some embodiments, for the special punctuation character, the controller may detect whether the punctuation is positioned at the end of the recognized text for the control word.

It should be noted that if the recognized text for the control word is ended with a punctuation mark, the recognized punctuation will have a smaller length than a length of a typical character. Therefore, it is required to determine a length of each punctuation. For example, for a recognized text "strongest animation season!", the punctuation mark "!" is positioned at the end of the recognized text. Therefore, the punctuation has a smaller length than a character. In this case, the length of the punctuation "!" may be determined.

For regular punctuations, such as a comma, a quotation mark, an exclamation mark, etc. a fixed length may be set individually, that is, each punctuation has its own specific length.

In some embodiments, for a special punctuation character not positioned at the end of the recognized text for the control word, the controller may detect the sum of the number of the characters and the number of special characters in the recognized text for the control word.

If the sum of the number of the characters and the number of the special characters is less than a preset threshold, the special punctuation character in the recognized text is determined to have a smaller length than the character. For example, the threshold may be set to a number 6. A recognized text "XY.SJ", comprising four characters "X", "Y", "S", "J" and a punctuation ".". The total number of two kinds of characters is 5, which is less than the threshold. Therefore, it may be determined that a control corresponding to this recognized text is a small-size control, and the special punctuation character "." has a length less than the length of a typical character. In this case, the length of a special punctuation character may be determined to be a fixed length.

If the sum of the number of the characters and the number of the special characters is not less than the preset threshold, the special punctuation character in the recognized text is determined to have the same length as a typical character. For example, the threshold is set to a number 6, a recognized text "JY.SJ.XX" has six characters "J", "Y", "S", "J", "X", "X" and two punctuations ".". The total number of two kinds of characters is 8, which is greater than the threshold. Therefore, the special punctuation character "." has the same length as a typical character, that is, H0.

In some embodiments, if the special character is a character of another language, such as Japanese and Russian, it may be determined that each special character has a fixed length, and there is a fixed ratio b between the length of a special character and the length of a typical character, that is, the special character of this type has a length of b*H0.

In some embodiments, if a special character is detected, and it does not have a fixed length, for example, it is determined that a non-regular punctuation which does not have a fixed length has the same length as the length of a typical character, that is H0.

In some embodiments, for an interface in English language, characters of all other languages are deemed as special characters.

For interfaces of other languages, characters of other languages except for this default language are all deemed as special characters. For example, for an English interface, a Chinese character is deemed as a special character, and a length of all Chinese characters may be set to a fixed value.

In some embodiments, when the X coordinate of the vertex in the lower left corner of each character is determined, the controller may calculate the total length of the typical characters and the total length of the null characters between the first character and each character, and may also calculate a total length of special characters between the first character and each character.

When calculating the total length of the special character(s), the controller may determine the number of special digit characters and all special punctuation characters and special English characters between the first character and each character. The controller may further calculate a total length of the special digit characters, a total length of the special punctuation characters, and a total length of the special English characters.

A length between the first character and each character in the recognized text of the control word may be calculated according to all the lengths, and an X coordinate of a vertex in a lower left corner of each character is determined, as shown in formula (5).

$$xi = x0 + L \qquad \text{formula (5)}.$$

Where L is the length between the first character and the $i^{th}$ character.

After the X coordinate of the vertex in the lower left corner of each character is determined, position information of each character may be obtained, and the position information of the control keyword in the user interface may be determined.

In some embodiments, after the position information of the control keyword in the user interface is obtained, a control at this position information of the control keyword may be triggered, and the control at this position information is a target control in the user voice.

Moreover, the controller may cause the display to present an interface corresponding to the target control.

In some embodiments, the instruction for triggering the control input from the user may not include the control keyword shown on the current user interface. For example, it may be that the user issues a command without a control keyword, or the control keyword does not exist on the user interface currently presented on the display.

After performing segmentation for a voice text for triggering a control, the controller may parse a segmentation result and extract a keyword from the segmentation result. If no control keyword exists in the extracted keyword, it seems difficult for the controller to trigger any control.

Alternatively, after the controller determines a control keyword, when the control keyword is matched with all the recognized texts on the screenshot image, if there is no match recognized text comprising the control keyword, that is, there is no recognized text for the control keyword, it seems difficult for the controller to trigger any control.

In this case, the display may be controlled to show preset prompt information, the prompt information is used for prompting the user that no relevant control is found.

Figure 21:
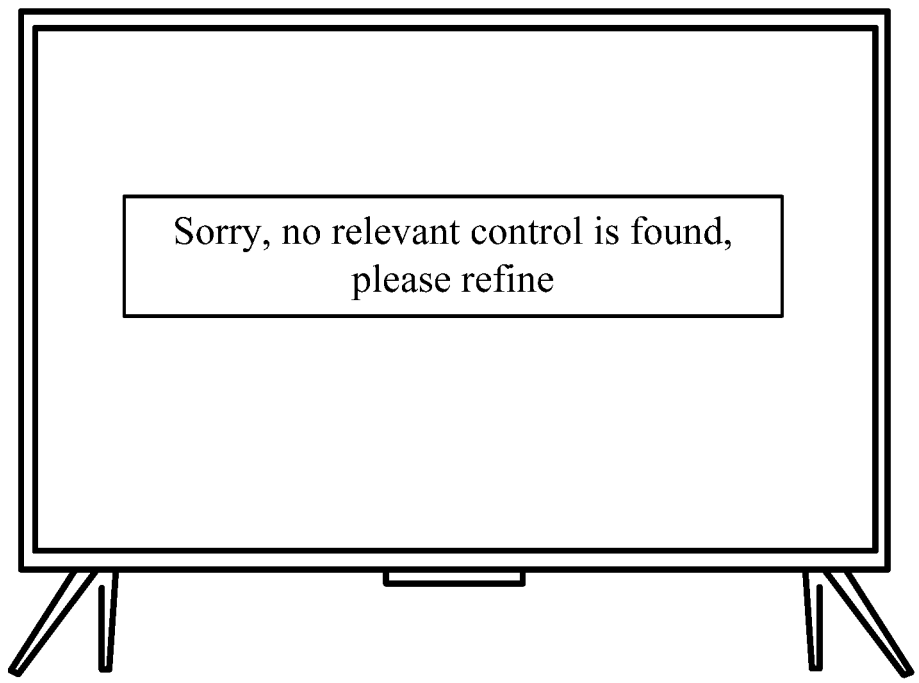
FIG. 21 is a schematic diagram of presenting prompt information on a display in some embodiments.

In some embodiments, the prompt information may use a preset prompt template. For example, the prompt information may be configured like "sorry, no relevant control is found, please redefine". The prompt template may also include a name of relevant media resource, for example: sorry, no control "A" is found, please continue to search for other controls. FIG. 21 shows a schematic diagram of presenting prompt information on a display in some embodiments.

In some embodiments, the controller may also convert the prompt information into a voice reply, and then play the voice reply to tell the user.

An embodiment of the disclosure further provides a method for triggering a control. The method can be performed by a display apparatus and includes the following processing.

Step 1201, in response to an instruction for triggering a control input from a user, a control keyword in the instruction for triggering the control is determined.

Step 1202, position information of the control word in a user interface is determined.

Step 1203, a control at the position information is triggered.

Figure 22:
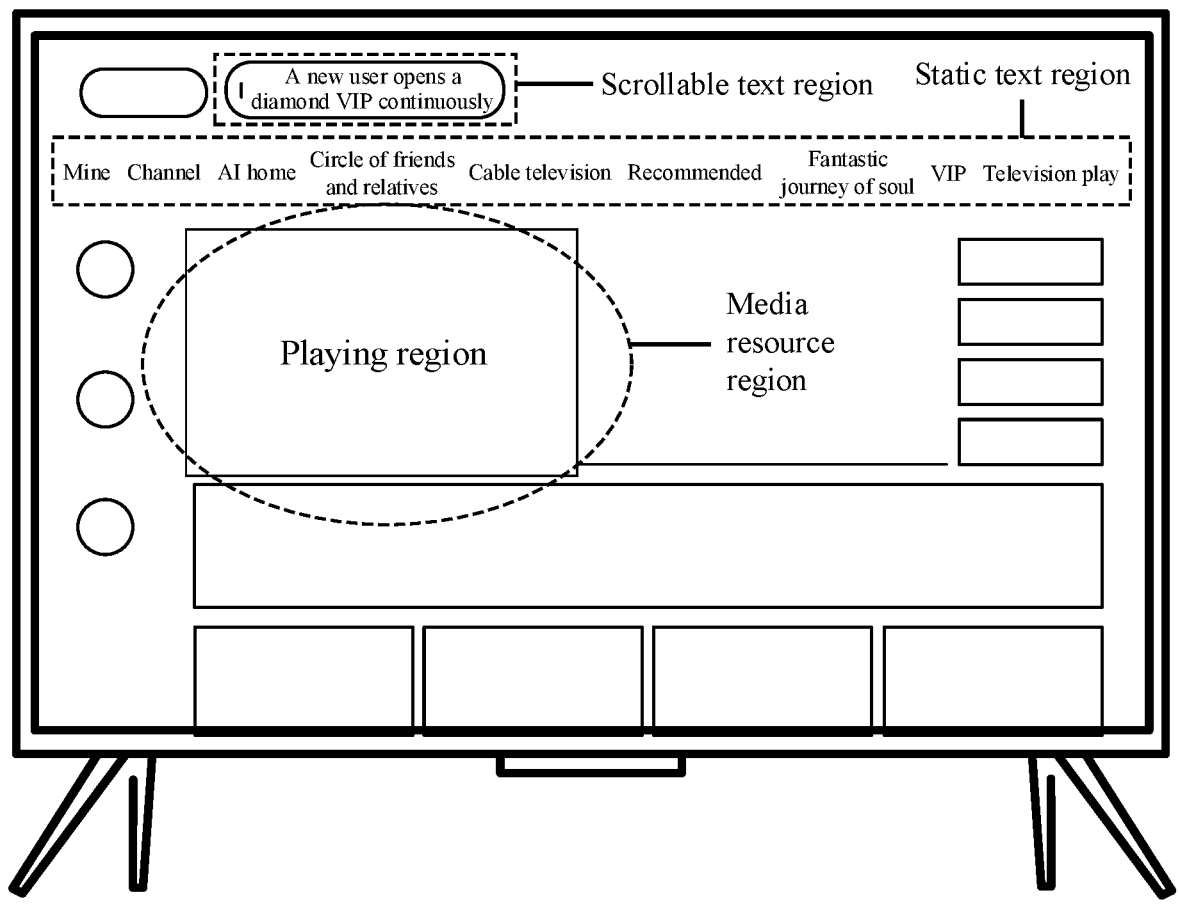
FIG. 22 is a schematic diagram of showing scrollable texts on a user interface according to one or more embodiments of the disclosure.

A text area may be divided into a static text region and a scrollable text region. Specifically, a user interface may include a plurality of static text regions and a plurality of scrollable text regions. FIG. 22 is a schematic diagram of showing a scrollable text on a user interface according to one or more embodiments of the disclosure.

In some embodiments, the display apparatus has a scrollable text detection function that may detect scrollable texts on the user interface. The display apparatus may have a scrollable text detection mode. In the scrollable text detection mode, the display apparatus may automatically detect the scrollable text region on the user interface, so as to obtain all scrollable texts on the user interface.

In some embodiments, a user may issue an instruction for starting scrollable text detection mode to the display apparatus by operating a specified key on a remote control. In actual scenario, a corresponding relation between the instruction for starting the scrollable text detection mode and the key on the remote control is pre-configured. For example, a key for starting the scrollable text detection mode is arranged on the remote control. When the user presses the key, the remote control transmits a command for starting the scrollable text detection mode to the controller of the display apparatus. In this case, the controller causes the display apparatus to enter a scrollable text detection mode. When the user presses the key again, the controller may cause the display apparatus to exit the scrollable text detection mode.

In some embodiments, corresponding relations between the instruction for starting the scrollable text detection mode and multiple keys on the remote control may also be pre-configured. When the user presses the multiple keys pre-configured with the instruction for starting the scrollable text detection mode, the remote control transmits a command for starting the scrollable text detection mode to the display apparatus. In an embodiment, the keys pre-configured with the instruction for starting the scrollable text detection mode are direction keys (left, down, left, down) in sequence. That is, the remote control transmits a command for starting the scrollable text detection mode to the controller when the user continuously presses the direction keys (left, down, left, down) within a preset time. By using the above pre-configured method described above, the instruction for starting the scrollable text detection mode may not start accidentally by a user. The embodiments of the disclosure only provide several configuration relations between an instruction for starting the scrollable text detection mode and one or more keys on the remote control. In an actual scenario, the configuration relation between the instruction for starting the scrollable text detection mode and the key(s) on the remote control may be set according to habits of the user.

In some embodiments, a sound acquirer, such as a microphone, in the display apparatus can be used to acquire an instruction for starting the scrollable text detection mode input via voice, so as to control the display apparatus to enter the scrollable text detection mode. The display apparatus may be configured with a smart voice system. The smart voice system may recognize a voice from the user to extract an instruction content input from the user. The user may input a preset trigger word through the microphone to turn on the smart voice system, so that the controller may respond to an instruction input from the user. After inputting the trigger word, a voice command for starting the scrollable text detection mode can be input within a certain time, to cause the display apparatus to enter into the scrollable text detection mode. For example, a voice command "Hi, XX" can be input to turn on the smart voice system. Then a voice command "enter the scrollable text detection mode" is input, to transmit an instruction for starting the scrollable text detection mode in the display apparatus.

In some embodiments, an instruction for starting the scrollable text detection mode in the display apparatus can be input via a preset gesture. The display apparatus may detect a behavior of the user through an image acquirer, such as a camera. Upon detecting a preset gesture, an instruction for starting the scrollable text detection mode is received. For example, it may be set as follows: when a letter V from a user's gesture is detected, it is determined that an instruction for starting the scrollable text detection mode in the display apparatus is received. An instruction for starting the scrollable text detection mode in the display apparatus can be input through a preset action. For example, it may be set as follows: when a lifts of the left foot and the right hand of the user at the same time is detected, it is determined that an instruction for starting the scrollable text detection mode in the display apparatus is input.

In some embodiments, when using a smart device such as a mobile phone to control the display apparatus, the user may also transmit an instruction for starting the scrollable text detection mode to the display apparatus. A control may be set in the mobile phone. Whether to enter the scrollable text detection mode may be selected through the control. In this case, the controller may control the display apparatus to enter the scrollable text detection mode.

In some embodiments, when using the mobile phone to control the display apparatus, the user may issue a continuous click instruction to the mobile phone. The continuous click instruction means that the number that the user clicks the same region on a touch screen of the mobile phone exceeds a preset threshold within a preset time period. For example, continuously clicking a certain region on the touch screen of the mobile phone 3 times within 1 s is determined as one time of continuous click instruction. After receiving the continuous click instruction, the mobile phone may transmit an instruction for starting the scrollable text detection mode to the display apparatus, so that the controller causes the display apparatus to enter the scrollable text detection mode.

In some embodiments, when the user uses the mobile phone to control the display apparatus, it may also be set as follows: when it is detected that a touch pressure, on a certain region of the touch screen of the mobile phone exceeds a preset pressure threshold, the mobile phone may transmit an instruction for starting the scrollable text detection mode to the display apparatus.

Alternatively, an option item for starting the scrollable text detection mode may also be set on a UI of the display apparatus. When this option item is selected, display apparatus is controlled to enter or exit the scrollable text detection mode.

Figure 23:
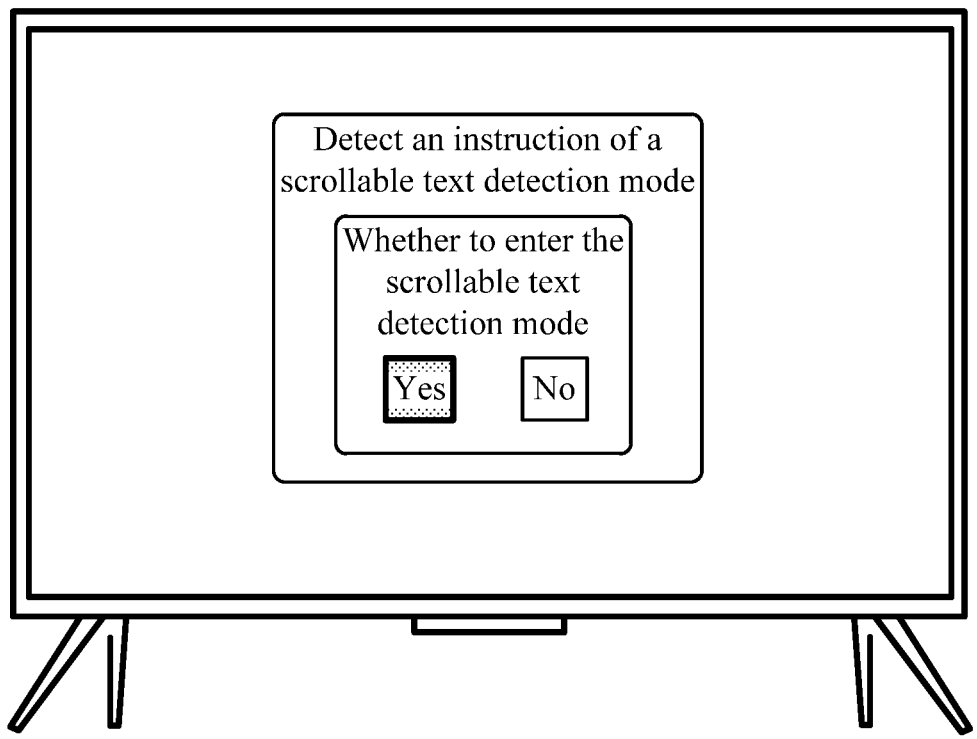
FIG. 23 is a schematic diagram of displaying confirmation information for a scrollable text detection mode on a display according to one or more embodiments of the disclosure.
Figure 24:
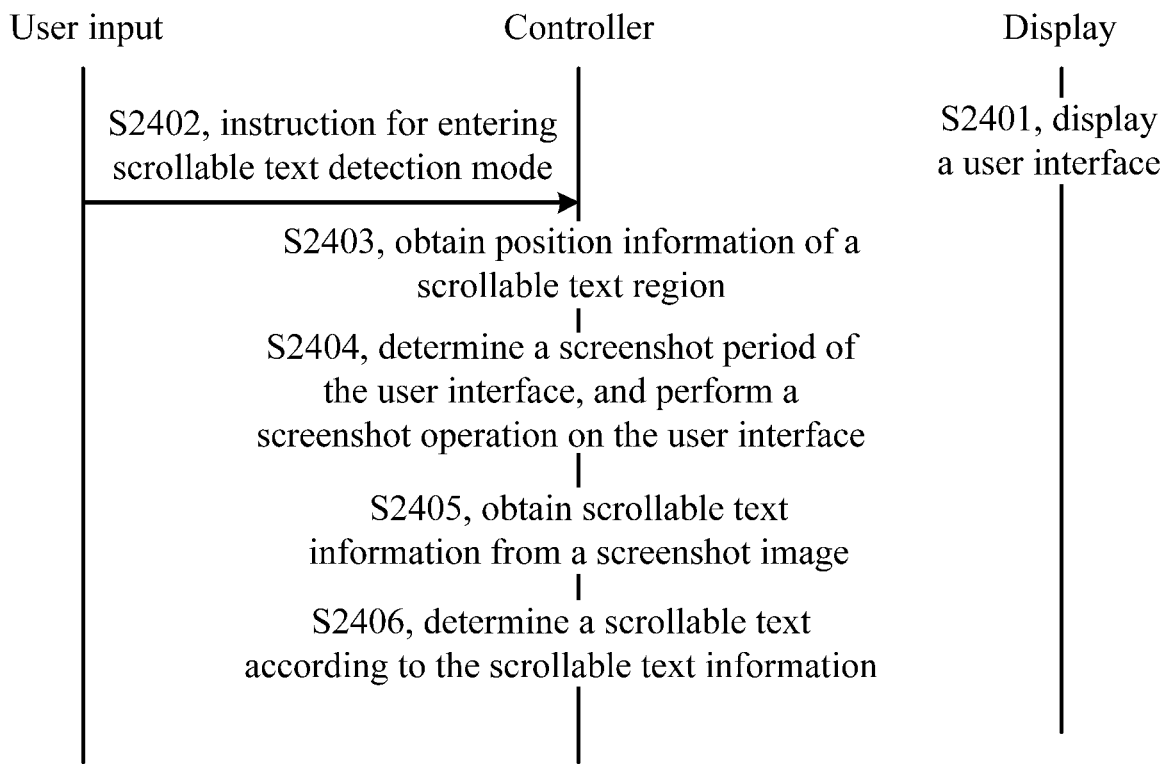
FIG. 24 is a flowchart of an interaction among components of a display apparatus according to one or more embodiments of the disclosure.

In some embodiments, in order to avoid accidentally selection of the option item for starting the scrollable text detection mode, when receiving an instruction for starting the scrollable text detection mode, the controller may cause the display to present confirmation information for starting the scrollable text detection mode for the user to confirm. Therefore, the user may reconfirm whether to control the display apparatus to enter the scrollable text detection mode. FIG. 23 is a schematic diagram of displaying confirmation information for a scrollable text detection mode on a display according to one or more embodiments of the disclosure. When entering the scrollable text detection mode, the display apparatus may detect the scrollable text region on the user interface automatically, so as to obtain all the scrollable texts on the user interface. FIG. 24 is a flowchart of an interaction among components in a display apparatus according to one or more embodiments of the disclosure. The interaction includes: step S2401, the display displays a user interface; step S2402, the controller receives an instruction for entering a scrollable text detection mode; step S2403, the controller obtains position information of a scrollable text region; step S2404, the controller determines a screenshot period of the user interface, and perform a screenshot operation on the user interface; step S2405, the controller obtains scrollable text information from a screenshot image; step S2406, the controller determines a scrollable text according to the scrollable text information.

In some embodiments, when entering the scrollable text detection mode, the display apparatus may detect a scrollable text. The controller may first obtain information, for example, extensible markup language (XML) information on a current user page. Further, position information of the scrollable text region may be obtained according to the information of the user interface. The XML information may include information related to each region on the user interface. For example, for the media resource region, the XML information may include position information of the media resource region. For the scrollable text region, the XML information may include a text scrolling speed and the position information of the scrollable text region.

It should be noted that different user interfaces presented on the display have different corresponding XML information. However, the obtained XML information may include the position information of the scrollable text region or not. Therefore, when the position information of the scrollable text region is obtained, the XML information of the user interface may be detected first, and whether the XML information includes the position information of the scrollable text region may be determined.

When it is detected that the XML information includes the position information of the scrollable text region, no additional operation is required, and the position information of the scrollable text region is directly extracted.

When it is detected that the XML information does not include the position information of the scrollable text region, the controller is required to obtain the position information of the scrollable text region.

In some embodiments, when obtaining the position information of the scrollable text region, the controller may first detect whether the XML information includes the position information of the media resource region.

It should be noted that similar to the position information of the scrollable text region, when the user interfaces presented on the display are different, the obtained XML information may include the position information of the media resource region or not.

The probability that the XML information does not include the position information of the media resource region is extremely low, so the embodiments of the disclosure do not take this situation into consideration and do not perform subsequent processing in this situation.

Figure 25:
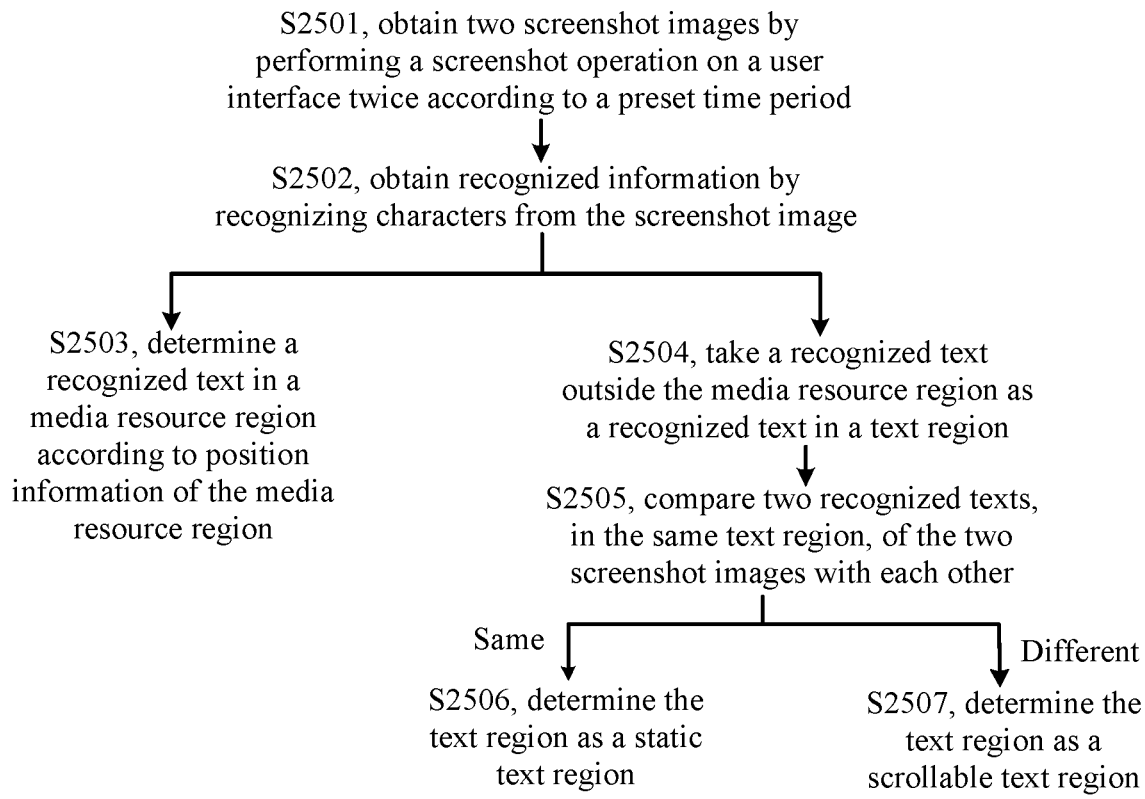
FIG. 25 is a schematic flowchart of obtaining position information of a scrollable text region according to one or more embodiments of the disclosure.

FIG. 25 is a flowchart of obtaining position information of a scrollable text region according to one or more embodiments of the disclosure. The method for obtaining position information of the scrollable text region includes: step S2501, the controller obtains two screenshot images by performing a screenshot operation on a user interface twice according to a preset time period; step S2502, the controller obtains recognized information by recognizing characters from the screenshot image; step S2503, the controller determines a recognized text in a media resource region according to position information of the media resource region; step S2504, the controller takes a recognized text outside the media resource region as a recognized text in a text region; step S2505, the controller compares two recognized texts, in the same text region, of the two screenshot images with each other; step S2506, if the two recognized texts are the same, the controller determines the text region as a static text region; step S2507, if the two recognized texts are different, the controller determines the text region as a scrollable text region.

When it is detected that the XML information includes the position information of the media resource region, the controller may perform two screenshot operations on the user interface according to a preset time period T to obtain a first screenshot image P1 and a second screenshot image P2. The first screenshot image and the second screenshot image are two screenshot images of the user interface at two time points.

The preset time period T may be configured, for example, according to an algorithm related to the scrollable text detection function. It should be noted that at two time points before and after the preset time period, contents in a scrollable text region are different, that is, contents, in the same scrollable text region, in the first screenshot image P1 and the second screenshot image P2 are different. Therefore, all the scrollable text regions may be determined. A specific preset time period varies depending on a scenario of the user interface.

A scrolling period of each scrollable text region may be predetermined, the scrolling period referring to a time required for playing an entire scrollable text region in a scrolled manner once. The preset time period T is required to be different from the scrolling periods of the scrollable text regions, so as to ensure that all the scrollable text regions may be recognized.

In some embodiments, after being obtained, the two screenshot images may undergo character recognition processing separately.

The screenshot image may undergo optical character recognition (OCR) processing. For example, the first screenshot image and the second screenshot image may be recognized separately through an OCR model, to obtain first recognition information and second recognition information. Alternatively, the screenshot image may be processed through other recognition technologies.

For a screenshot image, the recognition information obtained after OCR may include a specific recognized text and position information of the recognized text. The recognized text refers to all words, phrases, letters or other special characters simultaneously presented in each region on the current screenshot image. The position information of the recognized text comprises position information, in the screenshot image, of the recognized text, and may be in the form of coordinate information of the recognized text. It should be noted that the position information of the recognized text is also position information of a region corresponding to the recognized text.

After the recognition information of the two screenshot images is determined, position information of the scrollable text region may be further determined.

In some embodiments, when the position information of the scrollable text region is determined according to the recognition information of the two screenshot images, which regions of the user interface are the scrollable text regions may be confirmed first.

A user interface may have a media resource region, a static text region, and a scrollable text region. In order to accurately recognize the scrollable text, the scrollable text region is required to be determined first, and then the scrollable text region is recognized so as to obtain the scrollable text.

The media resource region may be determined according to the position information of the media resource region.

The recognition information of the screenshot image may include a first recognized text in the media resource region, a second recognized text in the static text region, and a third recognized text in the scrollable text region.

All the recognized texts are matched according to the position information of the media resource region to obtain the recognized text in the media resource region. In this case, the first recognized text in the media resource region may be deleted from the recognition information of the screenshot image. The remaining recognized texts are recognized texts of the text regions, that is, the second recognized text in the static text region and the third recognized text in the scrollable text region. However, in this case, it seems difficult to distinguish the second and third recognized texts.

In some embodiments, the controller may distinguish between the recognized texts in the static and scrollable text regions. Specifically, for the same text region A, recognized texts, at two time points, of the region A are obtained. The recognition information of the first screenshot image includes a recognized text AT1, at a first time point, of the text region A, and the recognition information of the second screenshot image includes a recognized text AT2, at a second time point, of the text region A, that is, the two recognized texts AT1 and AT2 at the two time points corresponding to the preset time period.

For the static text region, the static text presented on this static region will not change, and an entire static text will be presented at different time points. Therefore, two recognized texts corresponding to the static text region will have the same content.

For the scrollable text region, since the text presented on this scrolling region is scrolling, specific text information presented will also change over time. Therefore, two recognized texts corresponding to the scrollable text region will have different contents.

Accordingly, the controller may compare the first recognition information with the second recognition information. Specifically, the two recognized texts in the same text region corresponding to the two screenshot images may be compared with each other. If the two recognized texts in the same text region are the same, the text region is determined as the static text region. If the two recognized texts in the same text region are different and changed, the text region is determined as the scrollable text region.

Figure 26:
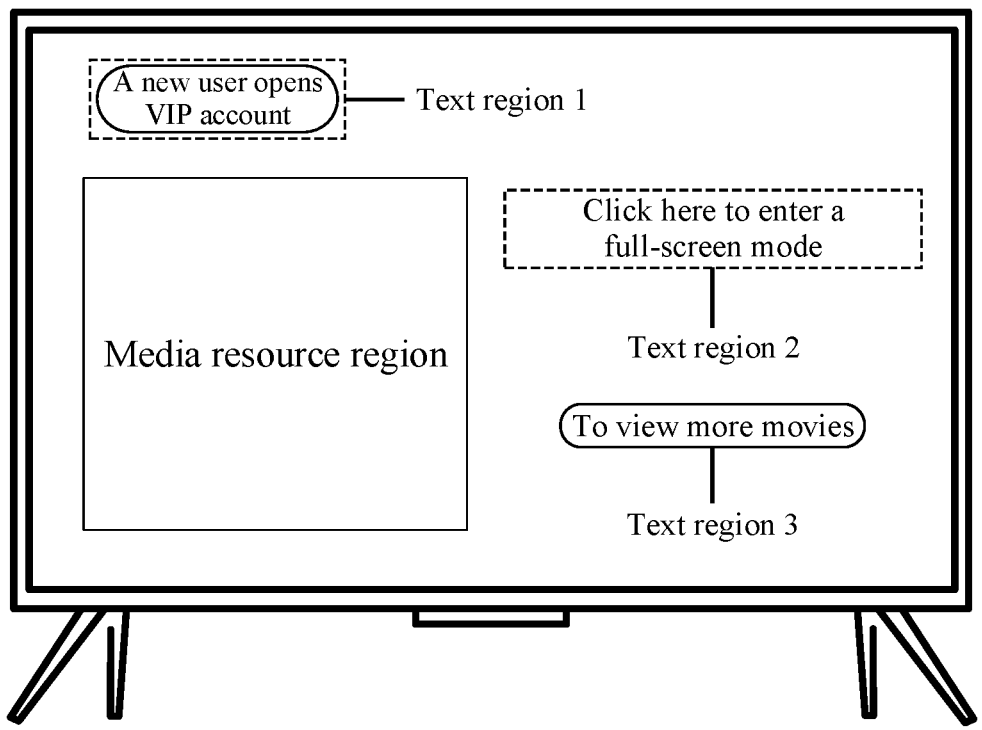
FIG. 26 is a schematic diagram of a user interface at a first time point according to one or more embodiments of the disclosure.

FIG. 26 is a schematic diagram of a user interface at a first time point according to one or more embodiments of the disclosure. The user interface includes a media resource region and three text regions. A screenshot of the user interface at the first time point is taken as a first screenshot image P1. Then the content is recognized from the first screenshot image to obtain recognized texts in the media resource region. A recognized text in text region 1 is "new user opens VIP account", a recognized text in text region 2 is "click here to enter a full-screen mode", and a recognized text in text region 3 is "to view more movies".

Figure 27:
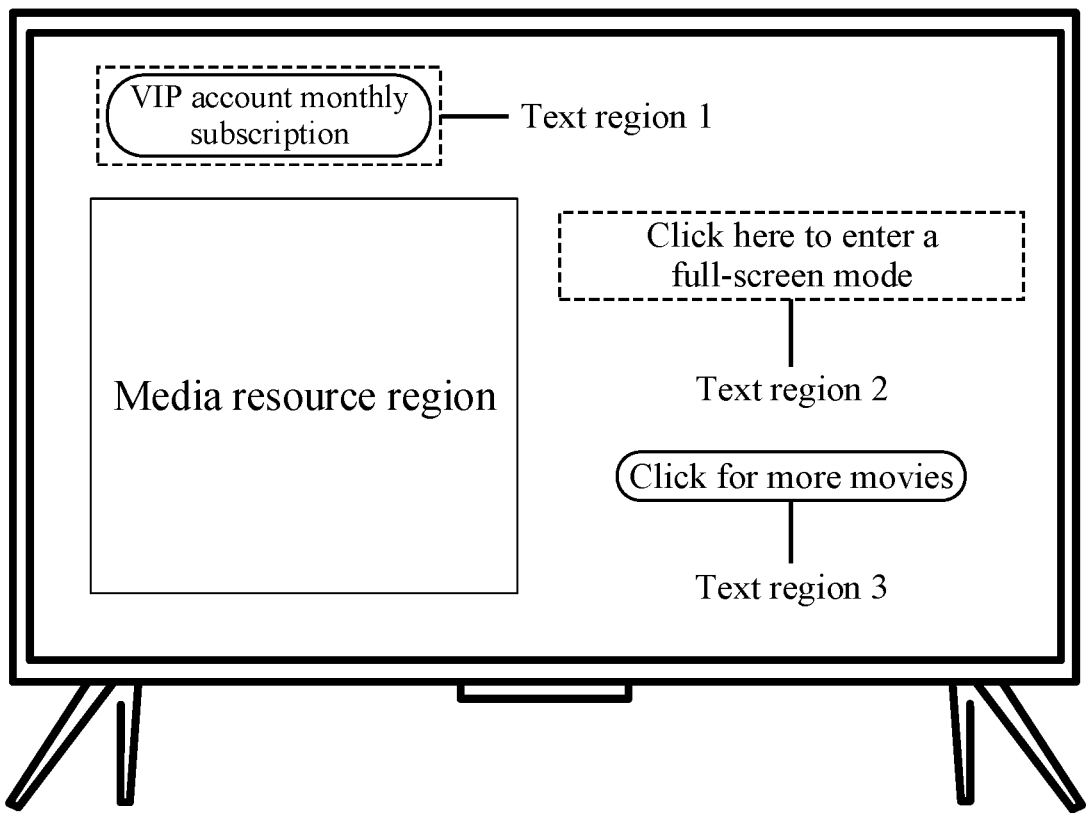
FIG. 27 is a schematic diagram of a user interface at a second time point according to one or more embodiments of the disclosure.

FIG. 27 is a schematic diagram of a user interface at a second time according to one or more embodiments of the disclosure. The first time point is spaced from the second time point by a preset time period T. The user interface includes a media resource region and three text regions. A screenshot of the user interface at the second time point is taken as a second screenshot image P2. Then content is recognized from the second screenshot image to obtain recognized texts of the media resource region. A recognized text in text region 1 is "VIP account monthly subscription", a recognized text in text region 2 is "click here to enter a full-screen mode", and a recognized text in text region 3 is "click for more videos".

By comparing the two screenshot images with each other, the scrollable text region may be determined. The recognized text in the media resource region is not taken into consideration. The recognized text corresponding to text region 1 or the recognized text corresponding to text region 3 at the two time points are different, so text region 1 and text region 3 are both determined as scrollable text regions. Two recognized texts corresponding to text region 2 at the two time points are the same, so text region 2 is determined as a static text region.

After all the scrollable text regions are determined, position information of these scrollable text regions may be obtained from recognition information of the two screenshot images. Specifically, for a scrollable text region, position information, in the screenshot image, of the recognized text is the position information of the scrollable text region, that is, the position information of the scrollable text region in the user interface.

In some embodiments, after the position information of the scrollable text region is determined, a scrollable text in the scrollable text region may be obtained.

It should be noted that only a portion of the scrollable text may be presented in a screenshot image. Therefore, a plurality of screenshot images may be obtained by performing a screenshot operation on the user interface repeatedly. By obtaining part of texts, corresponding to the scrollable text, from the plurality of screenshot images, and further analyzing part of the texts separately, an entire scrollable text may be obtained.

In some embodiments, in order to ensure that all scrollable words or phrases in the scrollable text may be obtained, a more appropriate period for taking screenshot, that is screenshot period, is required to be set.

In some embodiments, if there is only one scrollable text region in the user interface, or if there are a plurality of scrollable text regions in the user interface, but all of the scrollable text regions have the same scrolling speed, a range of the screenshot period of the user interface may be determined first.

In order to ensure that the scrollable letters, words or phrases obtained during the screenshot operation will not be missed, a maximum screenshot period may be determined and set as a first screenshot period. Moreover, in order to ensure that the scrollable content obtained during the screenshot operation will not be completely the same, a minimum screenshot period may also be determined and set as a second screenshot period.

Within a range between the first screenshot period and the second screenshot period, any period may be selected as a screenshot period for the user interface, so as to ensure the recognition accuracy of the scrollable text.

In some embodiments, the first screenshot period may be determined as follows.

Specifically, the first screenshot period may be calculated through the following formula (6).

$$T1 = \frac{T(N-Y)}{N-N_C}. \qquad \text{formula (6)}$$

Where T1 represents the first screenshot period, T represents a preset screenshot period, N represents a first number of characters, $N_C$ represents a second number of characters, and Y represents a preset number threshold.

Specifically, the first number of characters refers to, a number of characters in the recognized text, that is, the number of characters that may be presented at the same time in the scrollable text region. The second number of characters refers to, in the scrollable text regions in the first screenshot image P1 and the second screenshot image P2, a number of characters of a continuous text repeatedly appearing in two recognized texts.

The first number of characters may be confirmed according to recognition information of the first screenshot image P1 or the second screenshot image P2. When obtaining the second number of characters, a first recognized text in the scrollable text region of the first screenshot image P1 and a second recognized text in the scrollable text region of the second screenshot image P2 may be determined first. The number of characters of the continuous text repeatedly appearing in the first recognized text and the second recognized text is determined as the second number of characters.

It should be noted that the preset number threshold Y is a threshold configured. The number threshold represents a minimum number of characters of the continuous text that allows for repeatedly appearing in the recognized texts in the scrollable text regions of the two screenshot images before and after. In order to ensure that the scrollable characters in the scrollable text may be recognized, the continuous text is needed to repeatedly appear in the recognized texts in the scrollable text regions in the two screenshot images before and after. Therefore, by setting one number threshold, part of characters of the scrollable text avoids missing during the screenshot operation.

It should be noted that if the number threshold is set to 1, only one character is needed to repeatedly appear in the two recognized texts before and after. However, the same character may repeatedly appear in a sentence. Therefore, it is not accurate to set the number threshold to 1, that is, the number threshold is an integer greater than 1, and may be set to 2. In consideration of the recognition accuracy, the number threshold may also be set to 3 or other integers.

In some embodiments, a second screenshot period T2 may be determined through the following method.

Specifically, the second screenshot period may be calculated through the following formula (7).

$$T2 = \frac{T}{N - N_C}.$$
formula (7)

After the first screenshot period and the second screenshot period are determined, a range between the first screenshot period and the second screenshot period is determined, and all values in the range may satisfy a condition for taking a screenshot of the user interface, so that text information in a certain scrollable text region will not be missed.

Therefore, any period within the range may be selected as a screenshot period of the user interface.

In some embodiments, when there are a plurality of scrollable text regions in the user interface and scrolling speeds of all the scrollable text regions are different, all the scrollable text regions are required to be considered comprehensively to avoid missing some characters in a certain scrollable text region during performing a screenshot of the interface.

In this case, the controller may obtain the second screenshot periods of all the scrollable text regions, and take a second minimum screenshot period among all the second screenshot periods as the screenshot period for the user interface. Since this screenshot period is small, the screenshot processing will be performed on the user interface rapidly, so as to avoid missing content in a certain scrollable text region.

In some embodiments, a common range for meeting screenshot condition of all the scrollable text regions may also be determined.

Specifically, the first screenshot periods and the second screenshot periods of all the scrollable text regions may be obtained to determine ranges of the screenshot periods corresponding to all the scrollable text regions.

By performing intersection on all the ranges, a common range may be determined.

During intersection operation, a first minimum screenshot period among the first screenshot periods of all the scrollable text regions may be determined and set as a third screenshot period.

A second maximum screenshot period among the second screenshot periods of all the scrollable text regions may also be determined and set as a fourth screenshot period.

The third screenshot period and the fourth screenshot period are detected. If the third screenshot period is greater than the fourth screenshot period, it means that there is no intersection, and in this case, the controller may directly take the fourth screenshot period as the screenshot period of the user interface.

If the third screenshot period is less than the fourth screenshot period, it means that there is an intersection. Therefore, a range between the third screenshot period and the fourth screenshot period may be determined. In this case, a period within the range may be selected as the screenshot period of the user interface.

In some embodiments, after the screenshot period of the user interface is determined, the screenshot operation may be performed on the user interface according to the screenshot period to obtain a plurality of screenshot images.

Further, a screenshot image may be captured according to the position information of the scrollable text region to obtain a scrollable text image, corresponding to the scrollable text region, in the screenshot image. It should be noted that in a screenshot image, a scrollable text region corresponds to a scrollable text image. Therefore, a screenshot image may have a plurality of scrollable text images.

For a scrollable text region, it has a corresponding scrollable text image in each screenshot image. Therefore, a scrollable text region may have multiple scrollable text images, that is, the multiple scrollable text images obtained from multiple screenshot operations.

For a scrollable text region, recognition can be performed on the multiple scrollable text images corresponding to this scrollable text region to obtain multiple pieces of scrollable text information, that is, recognized texts.

Based on the multiple pieces of scrollable text information, words for connecting two adjacent pieces of scrollable text information can be determined, which are the words appearing both in the two adjacent pieces of scrollable text information. Based on the words for connecting two adjacent pieces of scrollable text information, a whole text after linking the two adjacent pieces of scrollable text information can be determined. After linking all the scrollable text information based on words for connecting two adjacent pieces of scrollable text information, a full text of the scrollable text region can be determined.

By performing the above operations for all the scrollable text regions, all the scrollable texts on the user interface may be obtained.

In some embodiments, the times of image capture may be preset as large as possible to ensure that all characters in the scrollable text may be captured as many as possible, so as to determine a whole scrollable text.

After performing multiple times of screenshot operations, the scrollable text may be determined according to these screenshot images.

In some embodiments, if the scrolling speeds of all the scrollable text regions in the user interface is the same, times of screenshot operations is high, which may lead to redundant images and system resource waste. In this case, each time a screenshot image is captured, characters may be recognized from a scrollable text image in this screenshot image to obtain a piece of scrollable text information. When a next piece of scrollable text information is obtained, two pieces of scrollable text information may be linked to obtain an expanded text. Moreover, when another piece of scrollable text information is obtained, this piece of scrollable text information continues to link with the expanded text above so as to get a updated expanded text. When it is detected that words for connecting two adjacent pieces of continuous scrollable text information has appeared in currently updated expanded text, it is determined that the entire scrollable text has existed in the currently updated expanded text. In this case, the currently updated expanded text is further processed by deleting the portion at the end of the currently updated expanded text which is the same as a portion at the beginning of the currently updated expanded text, to obtain the entire scrollable text.

In some embodiments, if the scrolling speeds of all the scrollable text regions on the user interface are different, a small screenshot period, for example, the second minimum screenshot period, is needed to avoid missing the content in a certain scrollable text region. In this case, if all the scrollable text images in each screenshot image are recognized, unnecessary calculation may occur, resulting in waste of system resources. For example, for some regions having a slow scrolling speed, contents in two scrollable text images from two adjacent screenshot images are exactly the same. Therefore, it is not necessary to recognize all the scrollable text images.

The controller may rank a plurality of screenshot images in chronological order to obtain a sequence of screenshot images. The sequence of screenshot images may be a sequence arranged from front to back in chronological order.

For a scrollable text region, a recognition frequency may be set. As a scrollable text region, its screenshot images can be selected from the sequence of screenshot images according to recognition frequency. For example, the recognition frequency of a certain scrollable text region is 5, which means that the scrollable text region is recognized once from every 5 screenshot images, and a first one among the 5 screenshot images may be selected for recognition.

After the recognized image of a scrollable text region is obtained, all recognized images may be captured according to the position information of each scrollable text region to obtain a plurality of scrollable text images for each scrollable text region.

Then content recognition is performed for the scrollable text image to obtain scrollable text information for each scrollable text region, and a scrollable text in each scrollable text region is further determined.

In some embodiments, a method for setting a recognition frequency of a scrollable text region is as follows, formula (8).

$$\frac{T2_M}{T_{ALL}} \le S_M \le \frac{T1_M}{T_{ALL}}.\qquad\text{formula (8)}$$

Where $T2_M$ represents a second screenshot period of an $M^{th}$ scrollable text region, $T1_M$ represents a first screenshot period of the $M^{th}$ scrollable text region, $T_{ALL}$ represents the screenshot period of a user interface, and $S_M$ represents a recognition frequency of the $M^{th}$ scrollable text region.

The recognition frequency of the scrollable text region is an integer. It is assumed that the recognition frequency is ranged from 2 to 5. In some embodiments, a maximum value 5 may be selected as the recognition frequency, to reduce calculation processing load.

Figure 28:
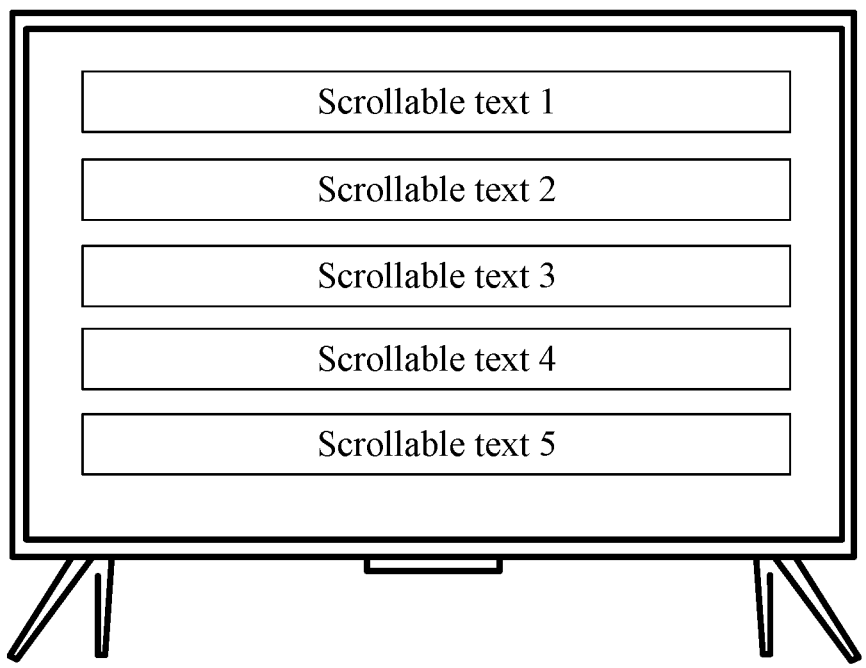
FIG. 28 is a schematic diagram of presenting scrollable text information on a display according to one or more embodiments of the disclosure.

In some embodiments, after recognizing scrollable texts in all the scrollable text regions, the controller may further cause the display to present the scrollable text information, the scrollable text information including all the scrollable texts on the user interface. FIG. 28 is a schematic diagram of presenting scrollable text information on a display according to one or more embodiments of the disclosure. All the scrollable texts may be presented on the display.

An embodiment of the disclosure further provides a method for detecting a scrollable text. The method is performed by a display apparatus and includes: step S1401, obtaining position information of a scrollable text region according to layout information of a user interface, where the scrollable text region is a region with a scrollable text in the user interface; step S1402, determining a screenshot period for the user interface, and performing a screenshot operation on the user interface according to the screenshot period to obtain a plurality of screenshot images; step S1403, obtaining a plurality of pieces of scrollable text information from the plurality of screenshot images based on the position information of the scrollable text region, and determining a scrollable text according to the plurality of pieces of scrollable text information.

The above description has been made in combination with the specific implementations for ease of explanation. However, the discussion described above in some embodiments is not intended to be exhaustive or to limit the implementations to the specific forms disclosed above. Various modifications and variations may be obtained according to the teachings described above. The implementations described above are selected and described in order to better explain principles and practical application. Therefore, those skilled in the art can better use the implementations and various different variations suitable for specific use.

What is claimed is:

1. A display apparatus, comprising:
    a display, configured to display an image from a broadcast system or a network, and/or a user interface;
    a detector, configured to acquire voice information from a user; and
    a controller, in connection with the display and the detector and configured to:
    display a user interface on the display;
    obtain the voice information input from the user while the user interface is displaying on the display;
    in response to the voice information, extract at least one keyword from the voice information, wherein the at least one keyword comprises a name content for indicating a controlled object and an action content for indicating an execution action;
    traverse action items in a configuration library, wherein controlled objects of the action items in the configuration library are configured according to applications built-in the display apparatus; in response to determining that no action item in the configuration library matches the at least one keyword, obtain text information of the user interface on the display, and obtain layout information of the user interface; extract a function control in a layout of the user interface according to the text information, wherein the function control is a control having a first text presented on the display and matched with the at least one keyword; and generate a control instruction according to the function control and the voice information;

in response to determining that a first action item in the configuration library matches the at least one keyword, cause the display apparatus to execute the first action item;

wherein the controller is further configured to:

traverse positions of all controls in the layout information of the user interface;

calculate a distance between a position of a second text in the text content in an image of the user interface and a position of a second control among the controls in the layout information of the user interface; and in response to determining that the distance is less than or equal to a preset distance threshold, mark the second control corresponding to the distance as the function control.

2. The display apparatus according to claim 1, wherein the controller is further configured to:

acquire the voice information from the user via the detector;

convert the voice information into a voice text; and extract the at least one keyword from the voice text.

3. The display apparatus according to claim 1, wherein the first action item comprises an action item of which a controlled object is the same as or similar to the name content in the at least one keyword and an action of which an execution action is the same as or similar to the execution action in the at least one keyword.

4. The display apparatus according to claim 2, wherein the controller is further configured to:

determine whether the voice text include an action instruction through a preset semantic recognition model;

in response to determining that the voice text include the action instruction, proceed to extract the at least one keyword from the voice text; and in response to determining that the voice text include no action instruction, cause the display to present a prompt, wherein the prompt comprises the voice text extracted from the voice information of the user.

5. The display apparatus according to claim 1, wherein the controller is further configured to:

take a screenshot of the user interface on the display to generate an image of the user interface; and perform optical character recognition (OCR) on the image of the user interface to obtain the text information of the user interface, wherein the text information comprises a text content and a position of the text content in the image of the user interface.

6. The display apparatus according to claim 1, wherein the controller is further configured to:

construct a set of words associated with the text information, wherein the set of associated words comprises a synonym of a name word in the text information;

traverse all control names in the layout information of the user interface;

compare the control names with the set of associated words; and in response to determining that a control name is the same as a content of any word item in the set of associated words, mark a control corresponding to the control name as the function control.

7. The display apparatus according to claim 1, wherein the controller is further configured to:

obtain one or more operation types supported by the function control and an action type specified based on the voice information;

compare the one or more operation types with the action type; and in response to determining that at least one of the one or more operation types is the same as the action type, generate the control instruction.

8. The display apparatus according to claim 1, wherein the controller is further configured to:

execute the control instruction; and construct an action item in a configuration library based on the control instruction and the controlled object.

9. The display apparatus according to claim 1, wherein the function control comprises a control which is able to configure with a picture or text for visual presentation on a user interface and an application icon.

10. A voice control method for a display apparatus, comprising:

displaying a user interface on a display of the display apparatus, wherein the display is configured to display an image from a broadcast system or a network, and/or display the user interface:

obtaining voice information input from a user while the user interface is displaying on the display;

in response to the voice information, extracting at least one keyword from the voice information, wherein the at least one keyword comprises a name content for indicating a controlled object and an action content for indicating an execution action;

traversing action items in a configuration library, wherein controlled objects of the action items in the configuration library are configured according to applications built-in the display apparatus; in response to determining that no action item in the configuration library matches the at least one keyword, obtaining text information of the user interface on the display, and obtaining layout information of the user interface; extracting a function control in a layout of the user interface according to the text information, wherein the function control is a control having a first text presented on the display and matched with the at least one keyword; and generate a control instruction according to the function control and the voice information;

in response to determining that a first action item in the configuration library matches the at least one keyword, causing the display apparatus to execute the first action item;

wherein the voice control method further comprises:

traversing positions of all controls in the layout information of the user interface;

calculating a distance between a position of a second text in the text content in an image of the user interface and a position of a second control among the controls in the layout information of the user interface; and in response to determining that the distance is less than or equal to a preset distance threshold, marking the second control corresponding to the distance as the function control.

11. The voice control method according to claim 10, further comprising:

acquiring the voice information from the user via the detector;

converting the voice information into a voice text; and extracting the at least one keyword from the voice text.

12. The voice control method according to claim 10, wherein the first action item comprises an action item of which a controlled object is the same as or similar to the name content in the at least one keyword and an action of which an execution action is the same as or similar to the execution action in the at least one keyword.

13. The voice control method according to claim 11, further comprising:

determining whether the voice text include an action instruction through a preset semantic recognition model;

in response to determining that the voice text include the action instruction, proceeding to extract the at least one keyword from the voice text; and in response to determining that the voice text include no action instruction, causing the display to present a prompt, wherein the prompt comprises the voice text extracted from the voice information of the user.

14. The voice control method according to claim 10, further comprising:

taking a screenshot of the user interface on the display to generate an image of the user interface; and performing optical character recognition (OCR) on the image of the user interface to obtain the text information of the user interface, wherein the text information comprises a text content and a position of the text content in the image of the user interface.

15. The voice control method according to claim 10, further comprising:

constructing a set of words associated with the text information, wherein the set of associated words comprises a synonym of a name word in the text information;

traversing all control names in the layout information of the user interface;

comparing the control names with the set of associated words; and in response to determining that a control name is the same as a content of any word item in the set of associated words, marking a control corresponding to the control name as the function control.

16. The voice control method according to claim 10, further comprising:

obtaining one or more operation types supported by the function control and an action type specified based on the voice information;

comparing the one or more operation types with the action type; and in response to determining that at least one of the one or more operation types is the same as the action type, generating the control instruction.

17. The voice control method according to claim 10, further comprising:

executing the control instruction; and constructing an action item in a configuration library based on the control instruction and the controlled object.

18. The voice control method according to claim 10, wherein the function control comprises a control which is able to configure with a picture or text for visual presentation on a user interface and an application icon.

* * * * *